United States Patent
Li et al.

(10) Patent No.: US 12,477,305 B2
(45) Date of Patent: Nov. 18, 2025

(54) COMMUNICATION METHOD AND APPARATUS

(71) Applicant: HUAWEI TECHNOLOGIES CO., LTD., Guangdong (CN)

(72) Inventors: Bingzhao Li, Beijing (CN); Lei Guan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 423 days.

(21) Appl. No.: 17/728,217

(22) Filed: Apr. 25, 2022

(65) Prior Publication Data

US 2022/0248184 A1    Aug. 4, 2022

Related U.S. Application Data

(63) Continuation of application No. PCT/CN2019/113489, filed on Oct. 26, 2019.

(51) Int. Cl.
  *H04W 4/06* (2009.01)
  *H04W 76/20* (2018.01)
  *H04W 76/30* (2018.01)

(52) U.S. Cl.
  CPC ............. *H04W 4/06* (2013.01); *H04W 76/20* (2018.02); *H04W 76/30* (2018.02)

(58) Field of Classification Search
  CPC ....... H04W 4/06; H04W 76/20; H04W 76/30; H04W 72/30; H04W 76/27; H04W 76/11; H04W 76/40
  USPC .......................................................... 370/329
  See application file for complete search history.

(56) References Cited

U.S. PATENT DOCUMENTS

| | | | |
|---|---|---|---|
| 2011/0032860 A1* | 2/2011 | Kojima | H04L 1/1671 370/312 |
| 2014/0286222 A1 | 9/2014 | Yu et al. | |
| 2016/0119762 A1* | 4/2016 | Zhu | H04B 7/0452 370/312 |
| 2017/0332215 A1* | 11/2017 | Lin | H04L 51/58 |
| 2018/0084463 A1* | 3/2018 | Tamaki | H04W 36/0016 |
| 2019/0223156 A1 | 7/2019 | Fujishiro et al. | |

FOREIGN PATENT DOCUMENTS

| | | |
|---|---|---|
| CN | 102316418 A | 1/2012 |
| CN | 104936149 A | 9/2015 |
| CN | 105247904 A | 1/2016 |
| CN | 107734646 A | 2/2018 |

(Continued)

OTHER PUBLICATIONS

Extended European Search Report issued in European Application No. 19949986.4 on Aug. 3, 2022, 11 pages.

(Continued)

*Primary Examiner* — Mang Hang Yeung
(74) *Attorney, Agent, or Firm* — Fish & Richardson P.C.

(57) ABSTRACT

This application provides a communication method and a related apparatus, and is applied to the multicast field. One example method includes: A first terminal device obtains a first multicast configuration parameter, where the first multicast configuration parameter includes a group radio network temporary identifier (G-RNTI) and an identifier of a multicast service. The first terminal device in an idle state or an inactive state receives the multicast service based on the first multicast configuration parameter.

26 Claims, 15 Drawing Sheets

(56) References Cited

FOREIGN PATENT DOCUMENTS

| CN | 108702592 A | 10/2018 |
|---|---|---|
| EP | 3240315 A1 | 11/2017 |
| EP | 3282725 A1 | 2/2018 |
| EP | 3484193 A1 | 5/2019 |
| WO | 2016119212 A1 | 8/2016 |
| WO | 2017028581 A1 | 2/2017 |
| WO | 2018133645 A1 | 7/2018 |

OTHER PUBLICATIONS

PCT International Search Report and Written Opinion issued in International Application No. PCT/CN2019/113489 on Jun. 10, 2020, 17 pages (with English translation).

3GPP TS 38.331 V15.7.0, "3rd Generation Partnership Project; Technical Specification Group Radio Access Network; NR; Radio Resource Control (RRC) protocol specification (Release 15)," Sep. 2019, 527 pages.

3GPP TS 38.306 V15.7.0, "3rd Generation Partnership Project; Technical Specification Group Radio Access Network; NR; User Equipment (UE) radio access capabilities (Release 15)," Sep. 2019, 55 pages.

* cited by examiner

COMMUNICATION METHOD AND APPARATUS

CROSS-REFERENCE TO RELATED APPLICATIONS

This application is a continuation of International Application No. PCT/CN2019/113489, filed on Oct. 26, 2019, the disclosure of which is hereby incorporated by reference in its entirety.

TECHNICAL FIELD

This application relates to the field of communication technologies, and in particular, to a communication method and apparatus.

BACKGROUND

A multicast technology is a point-to-multipoint communication technology. Currently, when terminal devices in a same cell transmit a multicast service by using a same group radio network temporary identifier (group radio network temporary identity, G-RNTI), the terminal devices each need to set up a radio resource control (RRC) connection to a base station, and then receive the multicast service by using the group radio network temporary identifier and a radio network temporary identifier (cell radio network temporary identifier, C-RNTI) through the RRC connection.

Therefore, in a conventional technology, a terminal device in an idle state or an inactive state is not supported in transmitting a multicast service.

SUMMARY

Embodiments of this application provide a communication method and apparatus, so that a terminal device in an idle state or an inactive state obtains a multicast service.

According to a first aspect, a communication method is provided. The method includes: A first terminal device obtains a first multicast configuration parameter, where the first multicast configuration parameter includes a group radio network temporary identifier (G-RNTI) and an identifier of a multicast service. The first terminal device in an idle state or an inactive state receives the multicast service based on the first multicast configuration parameter.

That a first terminal device obtains a first multicast configuration parameter may include: The first terminal device in the idle state or the inactive state receives the first multicast configuration parameter from a network device through a common channel. Alternatively, that a first terminal device obtains a first multicast configuration parameter may include: The first terminal device obtains the first multicast configuration parameter before entering the idle state or the inactive state. In other words, the first terminal device in a connected state obtains the first multicast configuration parameter. The common channel includes a broadcast control channel (BCCH) and/or a multicast control channel (MCCH).

It can be learned that, the terminal device obtains the multicast configuration parameter that includes the G-RNTI and the identifier of the multicast service, so that the terminal device in the idle state or the inactive state receives the multicast service based on the multicast configuration parameter that includes the G-RNTI and the identifier of the multicast service. In this way, the terminal device in the idle state or the inactive state obtains the multicast service.

In a possible implementation, the first multicast configuration parameter is determined based on a multicast configuration parameter of a second terminal device, the second terminal device is in the connected state, and the second terminal device and the first terminal device are served by a same network device.

It may be understood that the first multicast configuration parameter is a multicast configuration parameter allocated by the network device to the second terminal device that is in the connected state, and the second terminal device and the first terminal device are served by the same network device. In other words, both the second terminal device and the first terminal device are located in a service coverage area of the same network device or a sector antenna of the same network device, or located in a same cell or coverage of a same beam of the same network device.

In a possible implementation, that a first terminal device obtains a first multicast configuration parameter includes: The first terminal device receives the first multicast configuration parameter from the network device through the common channel, where the first terminal device is in the idle state or the inactive state.

It may be understood that, that a first terminal device obtains a first multicast configuration parameter may include: The first terminal device in the idle state or the inactive state receives the first multicast configuration parameter from the network device through the common channel.

It can be learned that the multicast configuration parameter from the network device is received through the common channel, so that the terminal device in the idle state or the inactive state obtains the multicast configuration parameter.

In a possible implementation, before that the first terminal device receives the first multicast configuration parameter from the network device through the common channel, the method further includes: The first terminal device sends indication information to the network device, where the indication information is used to request information about a multicast service currently performed by the network device.

It may be understood that the first terminal device sends the indication information to the network device before receiving the first multicast configuration parameter from the network device through the common channel. In other words, the network device may send the first multicast configuration parameter through the common channel based on the indication information of the first terminal device.

It can be learned that, the terminal device sends the indication information to the network device before receiving the multicast configuration parameter from the network device through the common channel, so that the network device sends the multicast configuration parameter through the common channel after receiving the indication information sent by the terminal device. In this way, the terminal device in the idle state or the inactive state obtains the multicast configuration parameter.

In a possible implementation, that a first terminal device obtains a first multicast configuration parameter includes: The first terminal device obtains the first multicast configuration parameter before entering the idle state or the inactive state.

It may be understood that, that a first terminal device obtains a first multicast configuration parameter may include: The first terminal device obtains the first multicast configuration parameter before entering the idle state or the inactive state. In other words, the first terminal device in the connected state obtains the first multicast configuration parameter. Further, the first multicast configuration parameter obtained by the first terminal device in the connected state is a multicast configuration parameter allocated by a network device to the first terminal device, and both the first multicast configuration parameter obtained by the first terminal device in the connected state and the first multicast configuration parameter received by the first terminal device in the idle state or the inactive state from the network device through the common channel may be used to receive the multicast service. Further, regardless of the first multicast configuration parameter obtained by the first terminal device in the connected state or the first multicast configuration parameter obtained by the first terminal device in the idle state or the inactive state, the first terminal device receives a same multicast service based on the first multicast configuration parameters.

It can be learned that the terminal device may alternatively obtain the multicast configuration parameter in the connected state. This diversifies manners of obtaining the multicast configuration parameter, and improves efficiency of obtaining the multicast configuration parameter.

In a possible implementation, the method further includes:
the first terminal device receives a connection release message from the network device, where the connection release message includes first indication information, and the first indication information is used to indicate that the first terminal device is allowed to receive the multicast service based on the first multicast configuration parameter after entering the idle state or the inactive state; and/or
the first terminal device sends second indication information to the network device, where the second indication information is used to indicate that the first terminal device has a capability of receiving the multicast service based on the first multicast configuration parameter in the idle state or the inactive state, or is used to indicate the first terminal device to receive the multicast service based on the first multicast configuration parameter in the idle state or the inactive state.

It may be understood that the first terminal device receives the connection release message from the network device; or the first terminal device sends the second indication information to the network device, and then receives the connection release message from the network device.

It can be learned that, when receiving the connection release message from the network device and/or sending the second indication information to the network device, the terminal device may receive the multicast service based on the first multicast configuration parameter in the idle state or the inactive state, so that the terminal device in the idle state or the inactive state obtains the multicast service.

In a possible implementation, after the first terminal device enters the connected state, the method further includes: The first terminal device sends a first request to the network device, where the first request is used to request to remain in the connected state.

It can be learned that the terminal device may send the first request to the network device after entering the connected state, so that the terminal device remains in the connected state. In this way, the network device does not release the terminal device.

In a possible implementation, the method further includes: The first terminal device receives a second multicast configuration parameter from the network device by using the G-RNTI, where the second multicast configuration parameter is scrambled by using the G-RNTI, and the second multicast configuration parameter is different from the first multicast configuration parameter. The first terminal device receives the multicast service based on the second multicast configuration parameter.

It may be understood that the second multicast configuration parameter is an updated multicast configuration parameter. The terminal device may obtain a multicast service based on the updated multicast configuration parameter, and the multicast service is the same as a multicast service obtained by the terminal device before the multicast configuration parameter is updated.

It can be learned that the terminal device receives the second multicast configuration parameter from the network device by using the G-RNTI, so that the multicast service is received based on the second multicast configuration parameter. In this way, the terminal device in the idle state or the inactive state obtains the multicast service.

In a possible implementation, the method further includes: The first terminal device receives a connection request from the network device, where the connection request is used to request the first terminal device to enter the connected state. The first terminal device determines, based on the connection request, whether to enter the connected state.

It may be understood that the first terminal device in the idle state or the inactive state may receive the connection request from the network device, and determine, based on the connection request, whether to enter the connected state.

It can be learned that, when receiving the connection request from the network device, the terminal device in the idle state or the inactive state may determine, based on the connection request, whether to enter the connected state, so that a large quantity of terminal devices in the idle state or the inactive state are prevented from simultaneously accessing the network device.

In a possible implementation, that the first terminal device determines, based on the connection request, whether to enter the connected state includes: The first terminal device determines to enter the connected state when at least one of the following conditions is met: a first value randomly selected by the first terminal device from a first value range is less than a first random factor threshold; quality of a reference signal measured by the first terminal device is less than an access threshold; a quality of service indicator of the multicast service corresponding to the first terminal device is greater than a quality of service threshold; or current battery power of the first terminal device is greater than specified battery power.

It can be learned that, the condition for determining, by the first terminal device, to enter the connected state is set, so that a large quantity of terminal devices in the idle state or the inactive state are prevented from simultaneously accessing the network device.

According to a second aspect, a communication method is provided. The method includes: A network device sends a first multicast configuration parameter to a first terminal device, where the first multicast configuration parameter includes a group radio network temporary identifier (G-RNTI) and an identifier of a multicast service. The network device sends the multicast service based on the first multicast configuration parameter.

It may be understood that, that a network device sends a first multicast configuration parameter to a first terminal device may include: The network device sends the first multicast configuration parameter to the first terminal device through a common channel. Alternatively, that a network device sends a first multicast configuration parameter to a first terminal device may include: After setting up a connection to the first terminal device, the network device sends the first multicast configuration parameter to the first terminal device. The common channel includes a broadcast control channel (BCCH) and/or a multicast control channel (MCCH).

It can be learned that the multicast configuration parameter that includes the G-RNTI and the identifier of the multicast service is sent to the terminal device, and the multicast service is sent based on the multicast configuration parameter that includes the G-RNTI and the identifier of the multicast service, so that the terminal device in an idle state or an inactive state receives the multicast service based on the multicast configuration parameter that includes the G-RNTI and the identifier of the multicast service. In this way, the terminal device in the idle state or the inactive state obtains the multicast service.

In a possible implementation, the first multicast configuration parameter is determined based on a multicast configuration parameter of a second terminal device, the second terminal device is in the connected state, and the second terminal device and the first terminal device are served by a same network device.

It may be understood that the first multicast configuration parameter is a multicast configuration parameter allocated by the network device to the second terminal device that is in the connected state, and the second terminal device and the first terminal device are served by the same network device. In other words, both the second terminal device and the first terminal device are located in a service coverage area of the same network device or a sector antenna of the same network device, or located in a same cell or coverage of a same beam of the same network device.

In a possible implementation, that a network device sends a first multicast configuration parameter to a first terminal device includes: The network device sends the first multicast configuration parameter to the first terminal device through the common channel.

It can be learned that the multicast configuration parameter is sent to the terminal device through the common channel, so that the terminal device in the idle state or the inactive state obtains the multicast configuration parameter.

In a possible implementation, before that the network device sends the first multicast configuration parameter to the first terminal device through a common channel, the method further includes: The network device receives indication information sent by the first terminal device, where the indication information is used to request information about a multicast service currently performed by the network device.

It can be learned that, the network device receives, before sending the multicast configuration parameter to the terminal device through the common channel, the indication information sent by the terminal device, so that the network device sends the multicast configuration parameter through the common channel after receiving the indication information sent by the terminal device. In this way, the terminal device in the idle state or the inactive state obtains the multicast configuration parameter.

In a possible implementation, the method further includes:

the network device sends a connection release message to the first terminal device, where the connection release message includes first indication information, and the first indication information is used to indicate that the first terminal device is allowed to receive the multicast service based on the first multicast configuration parameter after entering an idle state or an inactive state; and/or the network device receives second indication information sent by the first terminal device, where the second indication information is used to indicate that the first terminal device has a capability of receiving the multicast service based on the first multicast configuration parameter in the idle state or the inactive state, or is used to indicate the first terminal device to receive the multicast service based on the first multicast configuration parameter in the idle state or the inactive state.

It may be understood that the network device sends the connection release message to the first terminal device; or the network device receives the second indication information sent by the first terminal device, and then sends the connection release message to the first terminal device. Further, the second indication information may alternatively be sent by a core network device to the network device. In other words, the network device receives the second indication information sent by the core network device, and then sends the connection release message to the first terminal device.

It can be learned that, when the network device sends the connection release message to the terminal device, and/or receives the second indication information sent by the terminal device, the terminal device may receive the multicast service based on the first multicast configuration parameter in the idle state or the inactive state, so that the terminal device in the idle state or the inactive state obtains the multicast service.

In a possible implementation, the method further includes: The network device receives a first request sent by the first terminal device, where the first request is used to request to remain in the connected state.

It may be understood that the network device receives a second request sent by the core network device, where the second request is used to request the first terminal device to remain in the connected state. In other words, after receiving the second request sent by the core network device, the network device may enable the first terminal device to remain in the connected state.

It can be learned that, when the network device receives the first request sent by the terminal device or the core network device, the terminal device remains in the connected state. In this way, the network device does not release the terminal device.

In a possible implementation, the method further includes: The network device sends a second multicast configuration parameter to the first terminal device by using the G-RNTI, where the second multicast configuration parameter is scrambled by using the G-RNTI, and the second multicast configuration parameter is different from the first multicast configuration parameter. The network device sends the multicast service based on the second multicast configuration parameter.

It may be understood that the second multicast configuration parameter is an updated multicast configuration parameter. The network device may send a multicast service based on the updated multicast configuration parameter, and the multicast service is the same as a multicast service sent by the network device before the multicast configuration parameter is updated.

It can be learned that the network device sends the second multicast configuration parameter to the terminal device by using the G-RNTI, to send the multicast service based on the second multicast configuration parameter.

In a possible implementation, the method further includes: The network device sends a connection request to the first terminal device, where the connection request is used to request the first terminal device to enter the connected state.

That the network device sends a connection request to the first terminal device includes: When a resource of the network device is greater than a preset resource or a quantity of terminal devices in the connected state is less than a preset quantity, the network device sends the connection request to the first terminal device in the idle state or an active state through the BCCH, the MCCH, or a PDCCH. Further, the resource of the network device includes a storage resource of the network device or a radio resource of the network device.

It may be understood that the network device may send the connection request to the terminal device, and the terminal device in the idle state or the inactive state may determine, based on the connection request, whether to enter the connected state.

It can be learned that, when receiving the connection request from the network device, the terminal device in the idle state or the inactive state may determine, based on the connection request, whether to enter the connected state, so that a large quantity of terminal devices in the idle state or the inactive state are prevented from simultaneously accessing the network device.

According to a third aspect, a communication apparatus is provided. The apparatus includes: a processing module, configured to obtain a first multicast configuration parameter, where the first multicast configuration parameter includes a group radio network temporary identifier (G-RNTI) and an identifier of a multicast service; and a transceiver module, configured to receive the multicast service based on the first multicast configuration parameter.

In a possible implementation, the first multicast configuration parameter is determined based on a multicast configuration parameter of a second terminal device, the second terminal device is in a connected state, and the second terminal device and the communication apparatus are served by a same network device.

In a possible implementation, the transceiver module is specifically configured to receive the first multicast configuration parameter from a network device through a common channel, where the communication apparatus is in an idle state or an inactive state.

In a possible implementation, the transceiver module is further configured to send indication information to the network device, where the indication information is used to request information about a multicast service currently performed by the network device.

In a possible implementation, the transceiver module is specifically configured to obtain the first multicast configuration parameter before the communication apparatus enters the idle state or the inactive state.

In a possible implementation, the transceiver module is further configured to: receive a connection release message from a network device, where the connection release message includes first indication information, and the first indication information is used to indicate that the communication apparatus is allowed to receive the multicast service based on the first multicast configuration parameter after entering the idle state or the inactive state; and/or send second indication information to the network device, where the second indication information is used to indicate that the communication apparatus has a capability of receiving the multicast service based on the first multicast configuration parameter in the idle state or the inactive state, or is used to indicate the communication apparatus to receive the multicast service based on the first multicast configuration parameter in the idle state or the inactive state.

In a possible implementation, the transceiver module is further configured to send a first request to the network device, where the first request is used to request to remain in the connected state.

In a possible implementation, the transceiver module is further configured to: receive a second multicast configuration parameter from the network device by using the G-RNTI, where the second multicast configuration parameter is scrambled by using the G-RNTI, and the second multicast configuration parameter is different from the first multicast configuration parameter; and receive the multicast service based on the second multicast configuration parameter.

In a possible implementation, the transceiver module is further configured to receive a connection request from the network device, where the connection request is used to request the first terminal device to enter the connected state. The processing module is specifically configured to determine, based on the connection request, whether to enter the connected state.

In a possible implementation, the processing module is specifically configured to:
determine to enter the connected state when at least one of the following conditions is met:
a first value randomly selected by the communication apparatus from a first value range is1 less than a first random factor threshold;
quality of a reference signal measured by the communication apparatus is less than an access threshold;
a quality of service indicator of the multicast service corresponding to the communication apparatus is greater than a quality of service threshold; or
current battery power of the communication apparatus is greater than specified battery power.

In a possible design, the communication apparatus may be a terminal device or a chip in the terminal device. A structure of the terminal device includes a processor and a memory. The processor is configured to support the apparatus in performing a corresponding function in the communication method disclosed in any one of the first aspect or the possible implementations of the first aspect. The memory is configured to be coupled to the processor, and stores a program (instructions) necessary for the apparatus and/or data necessary for the apparatus. Optionally, the terminal device may further include a communication interface, configured to support communication between the apparatus and another network element.

In another possible implementation, the terminal device may include a unit or a module for performing a corresponding function or action in the communication method disclosed in any one of the first aspect or the possible implementations of the first aspect.

In still another possible implementation, the terminal device includes at least one processor and a transceiver apparatus. The at least one processor is coupled to the transceiver apparatus. The at least one processor is configured to execute a computer program or instructions, to control the transceiver apparatus to send and receive information. When the at least one processor executes the computer program or the instructions, the at least one processor is further configured to implement the foregoing method. For example, the transceiver apparatus may be a transceiver, a transceiver circuit, or an input/output interface. When the communication apparatus is the chip, the transceiver apparatus is the transceiver circuit or the input/output interface.

When the communication apparatus is the chip, a sending unit may be an output unit, for example, an output circuit or a communication interface, and a receiving unit may be an input unit, for example, an input circuit or a communication interface. When the terminal device is a network device, the sending unit may be a transmitter, and the receiving unit may be a receiver.

According to a fourth aspect, a communication apparatus is provided. The apparatus includes: a transceiver module, configured to: send a first multicast configuration parameter to a first terminal device, where the first multicast configuration parameter includes a group radio network temporary identifier (G-RNTI) and an identifier of a multicast service; and send the multicast service based on the first multicast configuration parameter.

In a possible implementation, the first multicast configuration parameter is determined based on a multicast configuration parameter of a second terminal device, the second terminal device is in a connected state, and the second terminal device and the first terminal device are served by a same network device.

In a possible implementation, the transceiver module is specifically configured to send the first multicast configuration parameter to the first terminal device through a common channel.

In a possible implementation, the transceiver module is further configured to receive indication information sent by the first terminal device, where the indication information is used to request information about a multicast service currently performed by the network device.

In a possible implementation, the transceiver module is further configured to: send a connection release message to the first terminal device, where the connection release message includes first indication information, and the first indication information is used to indicate that the first terminal device is allowed to receive the multicast service based on the first multicast configuration parameter after entering an idle state or an inactive state; and/or
  receive second indication information sent by the first terminal device, where the second indication information is used to indicate that the first terminal device has a capability of receiving the multicast service based on the first multicast configuration parameter in the idle state or the inactive state, or is used to indicate the first terminal device to receive the multicast service based on the first multicast configuration parameter in the idle state or the inactive state.

In a possible implementation, the transceiver module is further configured to receive a first request sent by the first terminal device, where the first request is used to request to remain in the connected state.

In a possible implementation, the transceiver module is further configured to: send a second multicast configuration parameter to the first terminal device by using the G-RNTI, where the second multicast configuration parameter is scrambled by using the G-RNTI, and the second multicast configuration parameter is different from the first multicast configuration parameter, and send the multicast service based on the second multicast configuration parameter.

In a possible implementation, the transceiver module is further configured to send a connection request to the first terminal device, where the connection request is used to request the first terminal device to enter the connected state.

In a possible design, the communication apparatus is used in a network side, and may be a network device. The network device may be a base station or an access point, or may be a chip in the base station or the access point. The network device has a function of implementing the network device in the second aspect.

In a possible implementation, a structure of the network device includes at least one processor and a memory. The at least one processor is configured to support the apparatus in performing a corresponding function in the communication method disclosed in any one of the second aspect or the possible implementations of the second aspect. The memory is configured to be coupled to the at least one processor, and stores a program (instructions) necessary for the apparatus and data necessary for the apparatus. Optionally, the network device may further include a communication interface, configured to support communication between the apparatus and another network element.

In another possible implementation, the network device may include a unit or a module for performing a corresponding action in the communication method disclosed in any one of the second aspect or the possible implementations of the second aspect.

In still another possible implementation, the network device includes at least one processor and a transceiver apparatus. The at least one processor is coupled to the transceiver apparatus. The at least one processor is configured to execute a computer program or instructions, to control the transceiver apparatus to send and receive information. When the at least one processor executes the computer program or the instructions, the at least one processor is further configured to implement the foregoing method. For example, the transceiver apparatus may be a transceiver, a transceiver circuit, or an input/output interface. When the communication apparatus is the chip, the transceiver apparatus is the transceiver circuit or the input/output interface.

When the communication apparatus is the chip, a receiving unit may be an input unit, for example, an input circuit or a communication interface; and a sending unit may be an output unit, for example, an output circuit or a communication interface. When the network device is a terminal device, the receiving unit may be a receiver, and the sending unit may be a transmitter.

It may be understood that, in this embodiment of this application, hardware parts that are responsible for input and output in the network device may be integrated.

According to a fifth aspect, this application provides a computer-readable storage medium. The computer-readable storage medium stores a computer program. When the program is executed by a processor, the method according to any one of the first aspect or the possible implementations of the first aspect is implemented.

According to a sixth aspect, this application provides a computer-readable storage medium. The computer-readable storage medium stores a computer program. When the program is executed by a processor, the method according to any one of the second aspect or the possible implementations of the second aspect is implemented.

According to a seventh aspect, a computer program product including instructions is provided. When the computer program product runs on a computer, the computer is enabled to perform the method according to any one of the first aspect and the second aspect or the possible implementations of the first aspect and the second aspect. All or a part of the computer program product may be stored in a storage medium encapsulated in a processor, or may be stored in a storage medium encapsulated outside a processor.

According to an eighth aspect, a communication system is provided. The system includes any one of the foregoing network devices and/or any one of the foregoing terminal devices.

BRIEF DESCRIPTION OF DRAWINGS

The following briefly describes the accompanying drawings used in descriptions of embodiments or the conventional technology.

DESCRIPTION OF EMBODIMENTS

The following describes technical solutions in embodiments of this application with reference to the accompanying drawings in embodiments of this application.

In the specification, claims, and accompanying drawings of this application, terms "first" and "second" are intended to distinguish between different objects but do not indicate a particular order.

First, the technical solutions in embodiments of this application may be used in a long term evolution (LTE) architecture, a universal mobile telecommunications system (UMTS) terrestrial radio access network (UTRAN) architecture, or a global system for mobile communications (GSM)/enhanced data rates for GSM evolution (EDGE) system radio access network (GSM EDGE radio access network, GERAN) architecture. In the UTRAN architecture or the GERAN architecture, a function of a mobility management entity (MME) is implemented by a serving general packet radio service (GPRS) support node (serving GPRS support node, SGSN), and a function of an SGW/a PGW is implemented by a gateway GPRS support node (GGSN). The technical solutions in embodiments of this application may be further used in another communication system, for example, a public land mobile network (PLMN) system, or even a future 5G communication system or a communication system after 5G. This is not limited in embodiments of this application.

For ease of understanding of this application, related technological knowledge in embodiments of this application is first described herein.

Figure 1:
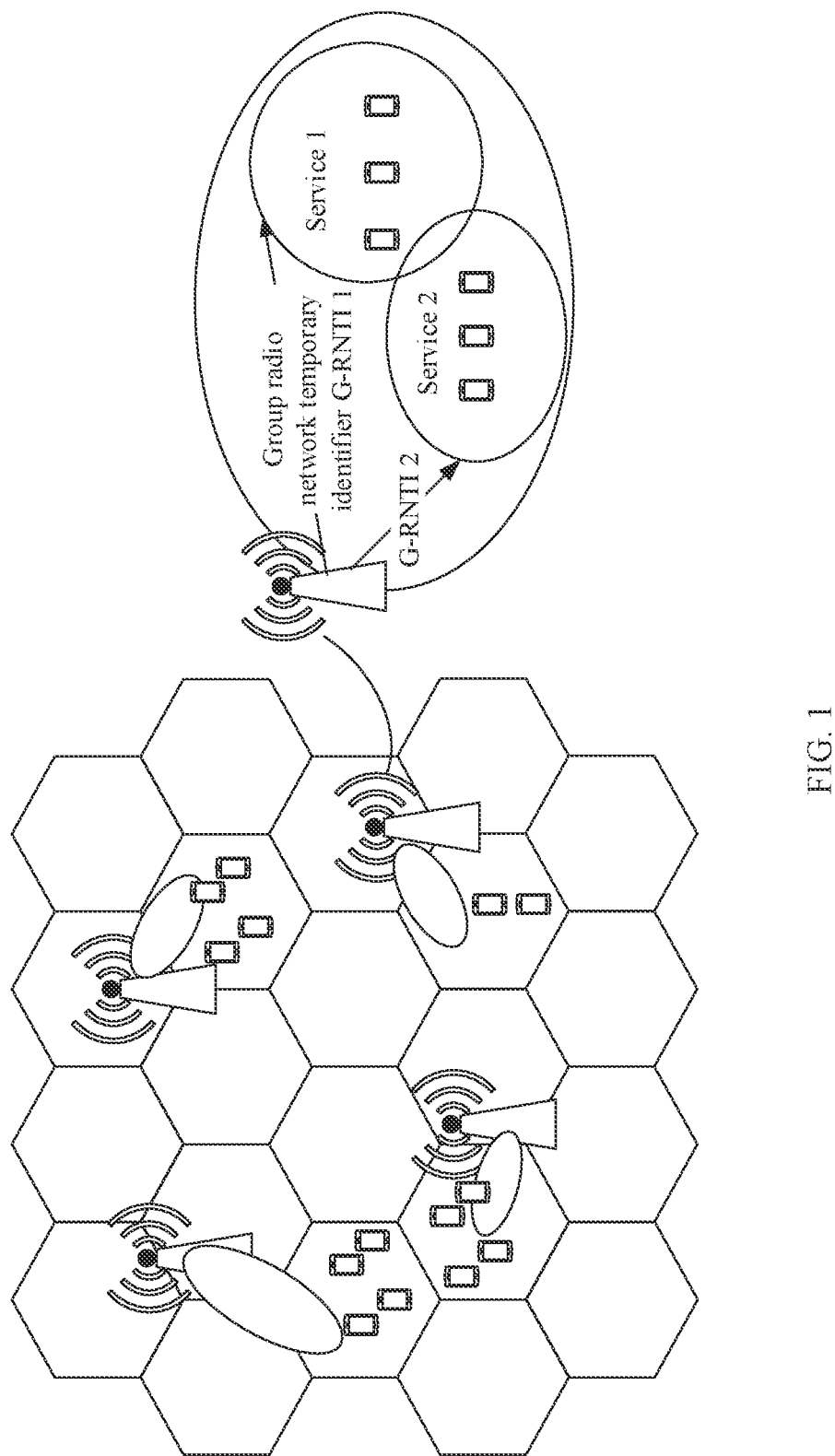
FIG. 1 is a schematic diagram of implementing multicast transmission by using SC-PTM according to an embodiment of this application.

Single cell point to multipoint (SC-PTM) is a technology for implementing multicast transmission. FIG. 1 is a schematic diagram of implementing multicast transmission by using SC-PTM according to an embodiment of this application. As shown in FIG. 1, in an SC-PTM technology, a cell may simultaneously schedule service data, for example, a live TV broadcast or trunking communication, to a plurality of terminal devices by using a G-RNTI, and each G-RNTI may be associated with one multimedia broadcast multicast service (MBMS). Therefore, in one area, only a cell that includes the terminal devices needs to send data, and a cell that does not include the terminal devices does not need to send data, so that air interface resources can be saved.

In the SC-PTM technology, a physical downlink shared channel (PDSCH) may be used to transmit a multicast service. Different from a PDSCH carrying unicast data, a PDSCH carrying multicast data may be referred to as a multicast PDSCH. In the SC-PTM technology, a network device may send, to a group of terminal devices in a cell, downlink control information (DCI) carried on a physical downlink control channel (PDCCH). After receiving the DCI, the group of terminal devices may receive a multicast PDSCH based on scheduling information included in the DCI. The DCI is in a DCI format 1A, and the DCI format 1A is used for allocation of consecutive resource blocks (RBs).

Figure 2:
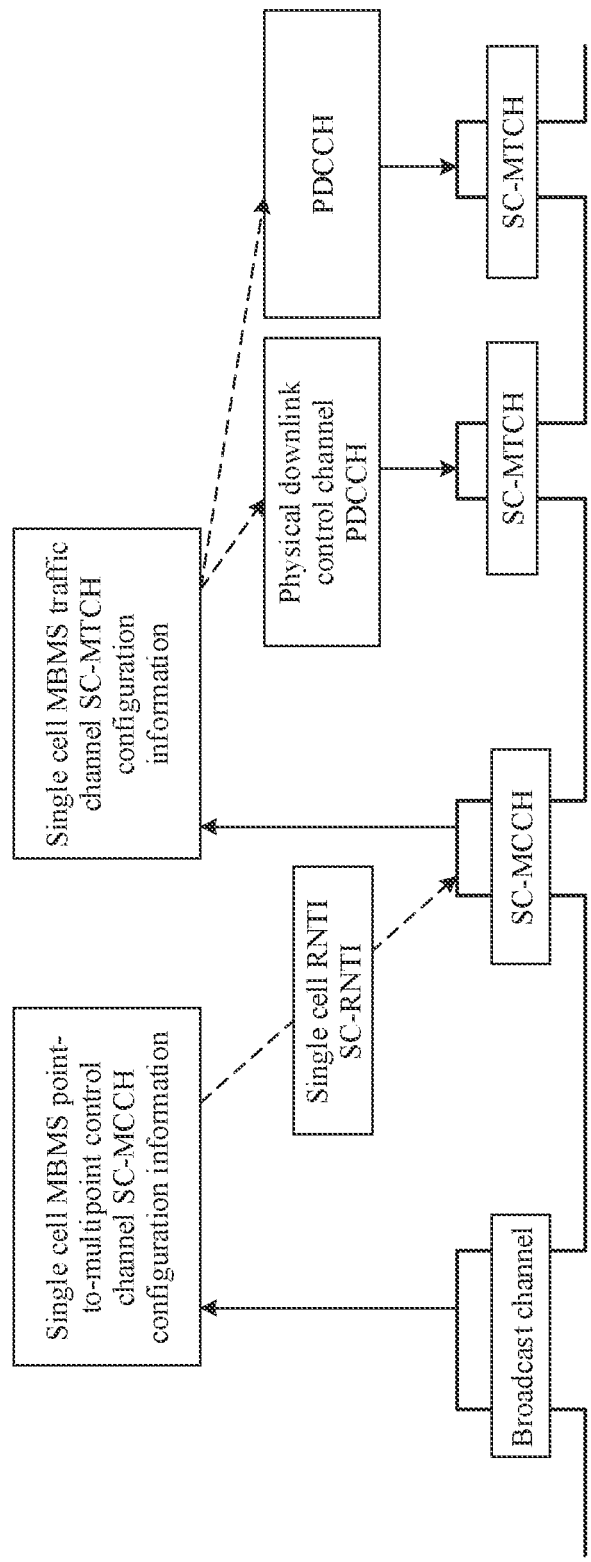
FIG. 2 is a schematic diagram of an SC-PTM channel configuration according to an embodiment of this application.

FIG. 2 is a schematic diagram of an SC-PTM channel configuration according to an embodiment of this application. As shown in FIG. 2, a single cell MBMS point-to-multipoint control channel (SC-MCCH) and a single cell MBMS traffic control channel (SC-MTCH) are configured in SC-PTM. The SC-MCCH is used to transmit control information, including SC-MTCH configuration information, for example, a G-RNTI and a discontinuous reception (DRX) mode parameter that correspond to the SC-MTCH. The SC-MCCH is used to periodically transmit data.

SC-MCCH configuration information may be transmitted through a broadcast channel. The SC-MCCH configuration information is used to configure a receiving parameter of the SC-MCCH, and may include a modification periodicity, a repetition periodicity, transmission duration, and the like of the MCCH. The SC-MCCH is transmitted through a PDCSH, and a PDCCH corresponding to the SC-MCCH is scrambled by using a single cell RNTI (SC-RNTI). A value of the SC-RNTI is fixed in a protocol and does not need to be configured in broadcasting.

The SC-MTCH configuration information may be transmitted through the SC-MCCH. The SC-MTCH configuration information may include configuration information of a multicast service. Configuration information of each service may include a temporary multicast group identifier (TMGI) of the service, a corresponding G-RNTI, a DRX parameter, and information about a neighboring cell that sends the configuration information of the service. The SC-MTCH is also carried on a PDSCH, and a PDCCH corresponding to the SC-MTCH is scrambled by using a G-RNTI.

Figure 3:
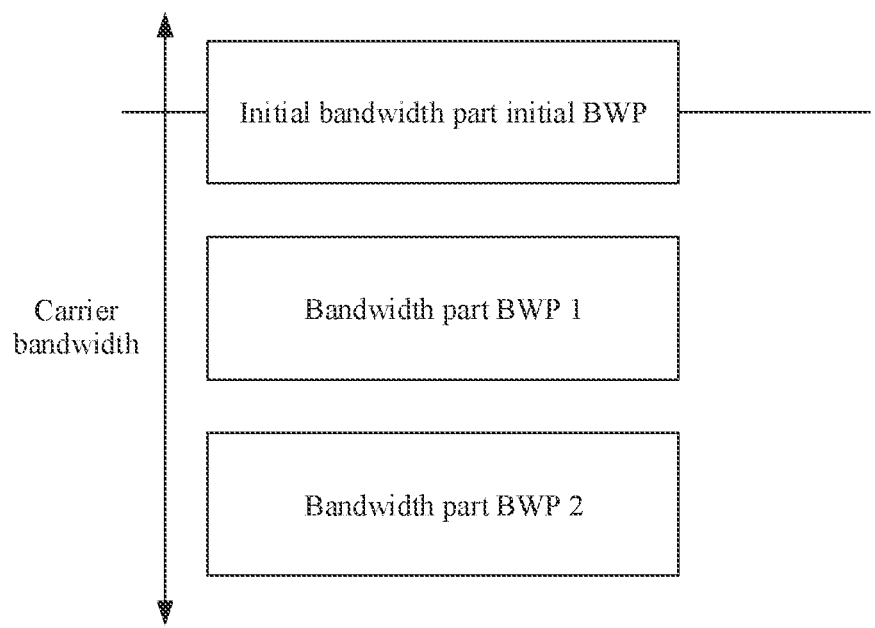
FIG. 3 is a schematic diagram of carrier bandwidth according to an embodiment of this application.

FIG. 3 is a schematic diagram of carrier bandwidth according to an embodiment of this application. As shown in FIG. 3, a bandwidth part (BWP) is a bandwidth part of a cell, and main parameters of the bandwidth part include bandwidth, a frequency position, a subcarrier spacing (SCS), a cyclic prefix (CP), configuration information related to a control resource set (CORSET), and configuration information related to a PDSCH. A cell has at least one initial BWP, and all common information such as a broadcast and paging is sent on the initial BWP. After a terminal device enters a connected state, a base station configures some dedicated BWPs for the terminal device, and the terminal device may send and receive data and perform PDCCH retrieval on the BWPs. For a same terminal device, only one BWP can be in an active state at a same moment.

In an SC-PTM technology, a core network device and a network device are not associated with a terminal device when establishing a multicast channel, and the network device notifies, through an SC-MCCH, terminal devices in all states to receive a multicast service. For example, all the states include a connected state and an idle state or an inactive state. Further, a same multicast procedure is used when the terminal devices in the connected state and the idle state or the inactive state receive the multicast service. To support the same multicast procedure, the core network device and the network device need to have a separate multicast startup process. To be specific, when the network device receives the multicast service sent by the core network device, a dedicated data channel needs to be established between the network device and the core network device for each terminal device. As a result, this process is excessively complex. To simplify this process, a multicast technology based on a unicast connection is proposed in the conventional technology.

Figure 4:
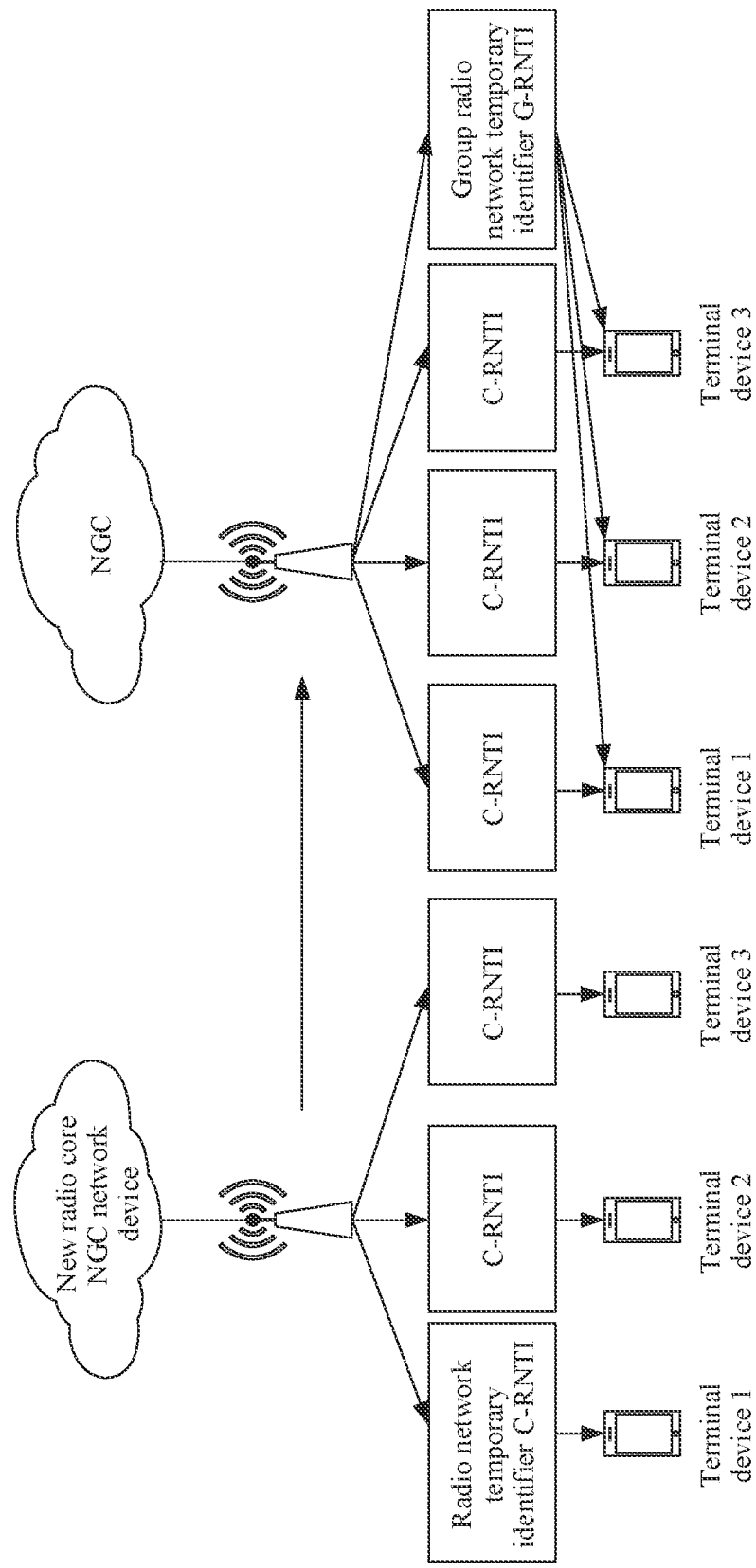
FIG. 4 is a schematic diagram of allocating C-RNTIs and G-RNTIs to terminal devices according to an embodiment of this application.

FIG. 4 is a schematic diagram of allocating C-RNTIs and a G-RNTI to terminal devices according to an embodiment of this application. As shown in FIG. 4, in 5G, a service is transmitted between a new radio core (NGC) network device and a network device. Three terminal devices correspond to different C-RNTIs, but correspond to a same G-RNTI. A C-RNTI is used by a single terminal device to receive scheduling information for the terminal device, and may be used to schedule signaling or data transmission for a single user. A G-RNTI is used to simultaneously schedule a plurality of terminal devices to receive a same service. For a same service, if a C-RNTI is used for scheduling, only a terminal device configured with the C-RNTI can receive the service. For example, a terminal device 1 uses a C-RNTI corresponding to the terminal device 1 to receive a service sent by the network device to the terminal device 1, but a terminal device 2 cannot receive the service sent by the network device to the terminal device 1. However, if a G-RNTI is used for scheduling, the plurality of terminal devices may receive the service.

Figure 5:
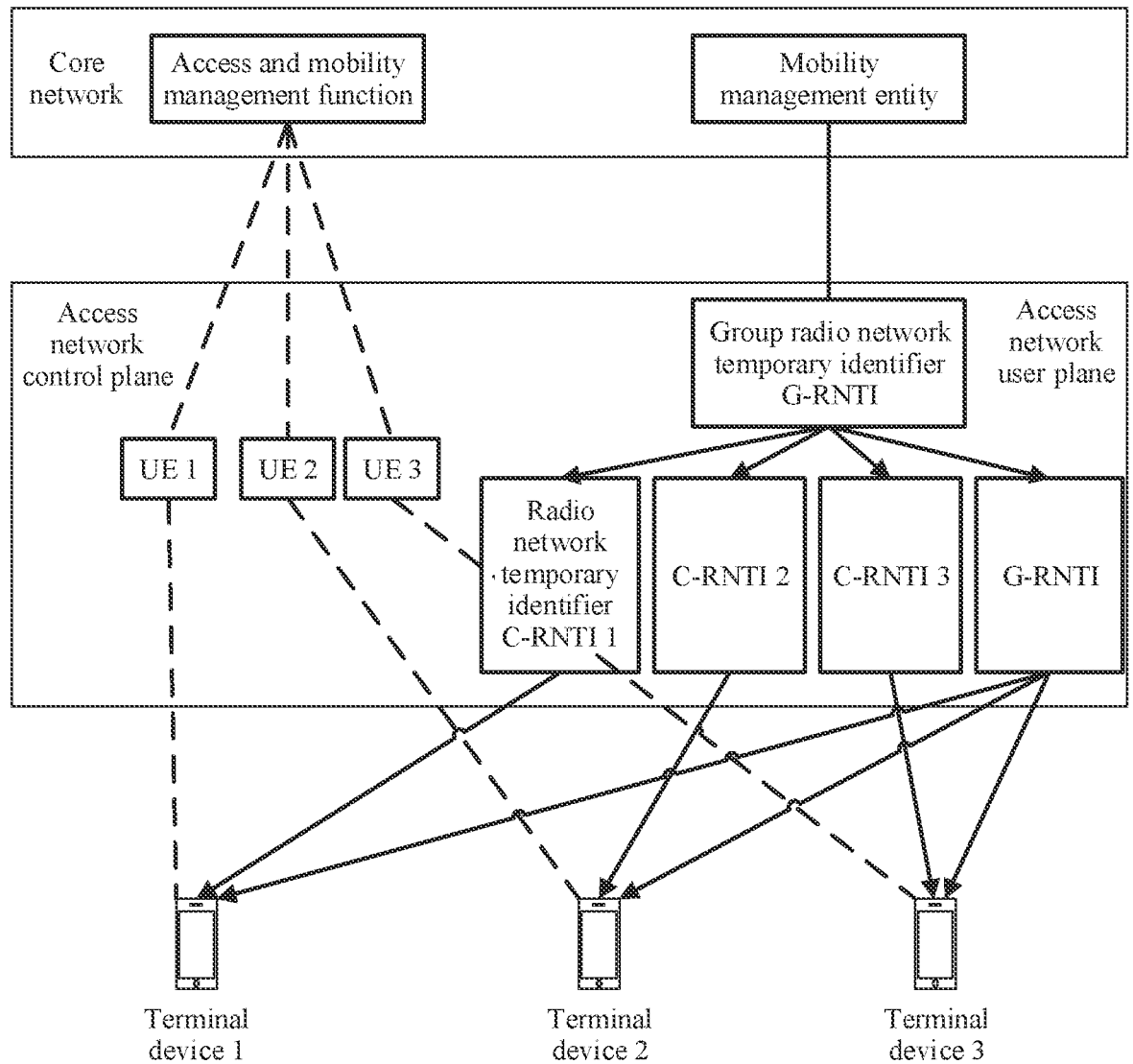
FIG. 5 is another schematic diagram of allocating C-RNTIs and G-RNTIs to terminal devices according to an embodiment of this application.

Specifically, FIG. 5 is another schematic diagram of allocating C-RNTIs and G-RNTIs to terminal devices according to an embodiment of this application. As shown in FIG. 5, a dashed line represents a control plane connection, and a solid line represents a user data sending path. Three terminal devices are all connected to a network device. The network device configures, for each terminal device, a C-RNTI and a data radio bearer (DRB) that is used for an RRC connection, and the DRB is further associated with a G-RNTI, so that dynamic switching between unicast and multicast is implemented through scheduling by using the G-RNTI and the C-RNTI. In FIG. 5, the three terminal devices receive a same service, and each terminal device has an RRC connection, namely, a channel for receiving data based on a C-RNTI. The network device further configures a same G-RNTI for the three terminal devices. When the C-RNTIs are used for scheduling, the network device may separately schedule same data to the three terminal devices. In this case, unicast scheduling is performed. When the G-RNTI is used to schedule data, the network device schedules one piece of data, and all the three terminal devices can receive the data.

Figure 6:
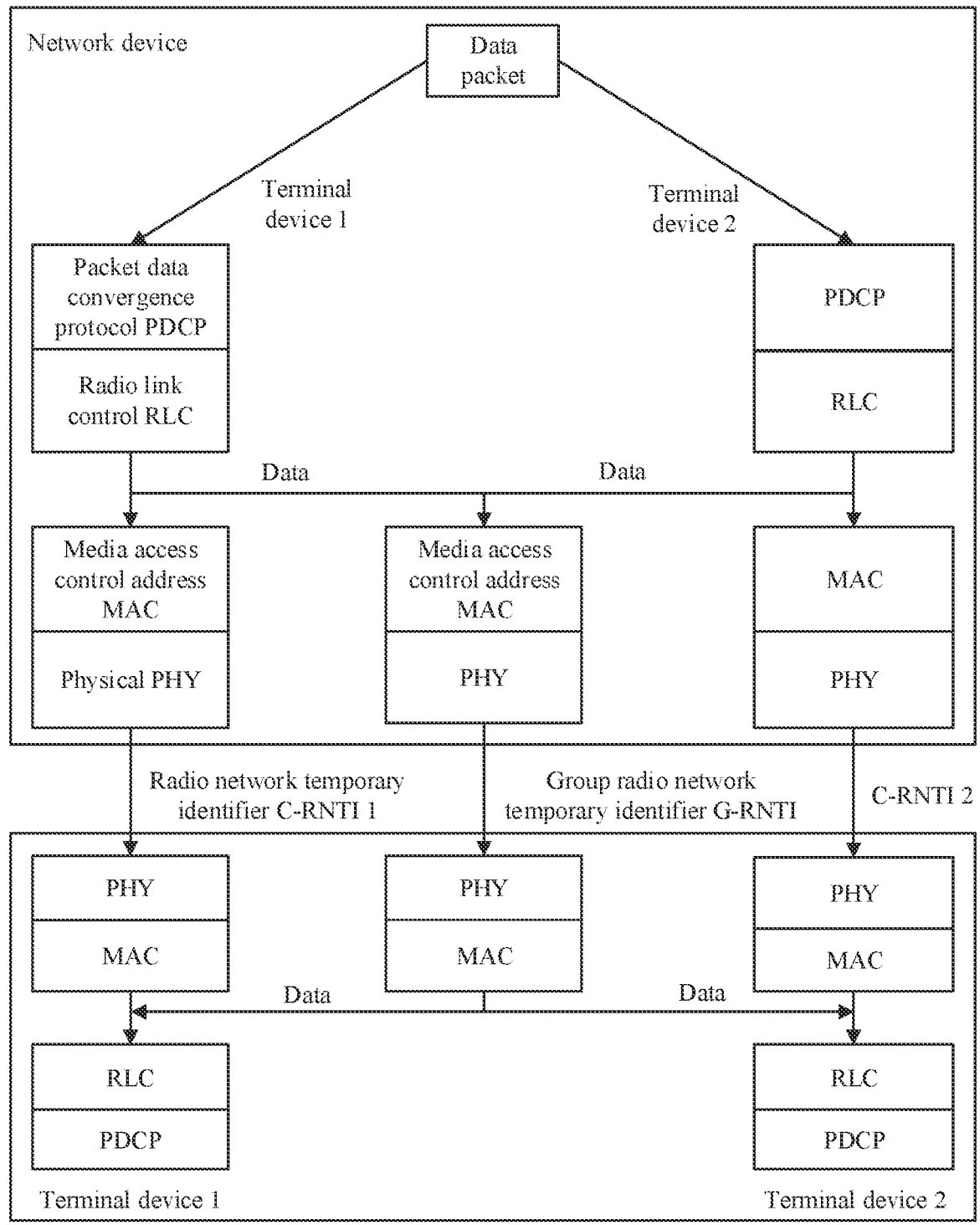
FIG. 6 is a schematic diagram of data combination according to an embodiment of this application.

Further, FIG. 6 is a schematic diagram of data combination according to an embodiment of this application. As shown in FIG. 6, after passing data of each terminal device through a packet data convergence protocol (PDCP) layer and a radio link control (RLC) layer, the network device may sequentially transmit, through a media access control address (MAC) layer and a physical (PHY) layer, the data to the terminal device by using a C-RNTI and a G-RNTI. The terminal device sequentially receives, through the PHY layer and the MAC layer, the data by using the C-RNTI and the G-RNTI, and then combines, at the RLC layer and/or the PDCP layer, the data received by using the C-RNTI and the G-RNTI into an RRC connection for processing.

It can be learned that when a multicast service is transmitted through the RRC connection, the terminal device needs to enter a connected state. Therefore, in a conventional technology, a terminal device in an idle state or an inactive state is not supported in obtaining a multicast service.

Based on this, embodiments of this application provide a communication method to resolve the foregoing problem. The following describes embodiments of this application in detail.

Figure 7:
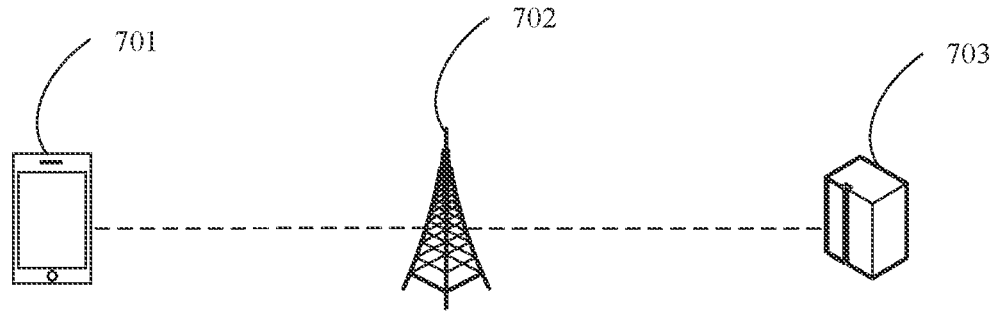
FIG. 7 is a schematic diagram of a network architecture according to an embodiment of this application.

FIG. 7 is a schematic diagram of a network architecture according to an embodiment of this application. As shown in FIG. 7, the network architecture may include a terminal device 701, a network device 702, and a core network device 703. The terminal device 701 and the network device 702 may be connected by using a network, and the network device 702 and the core network device 703 may be connected by using a network. The core network device 703 is configured to: send information to the network device 702, and receive information from the network device 702. The network device 702 is configured to: send information to the terminal device 701 and the core network device 703, and receive information from the terminal device 701 and the core network device 703. The terminal device 701 is configured to: send information to the network device 702, and receive information from the network device 702.

The terminal device 701 may be a device that includes a wireless sending and receiving function and that can cooperate with the network device to provide a communication service for a user. Specifically, the terminal device may be user equipment (UE), an access terminal, a subscriber unit, a subscriber station, a mobile station, a remote station, a remote terminal, a mobile device, a terminal device, a terminal, a wireless communication device, a user agent, or a user apparatus. For example, the terminal device may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal in a future 5G network, or a terminal in a future evolved PLMN. This is not limited in embodiments of this application.

The network device 702 may be a device configured to communicate with a user terminal, for example, a base transceiver station (BTS) in a GSM system or a CDMA system, a NodeB (NB) in a wideband code division multiple access (WCDMA) system, an evolved NodeB (evolutional node B, eNB or eNodeB) in an LTE system, a radio controller in a cloud radio access network (CRAN) scenario, a relay station, an access point, a vehicle-mounted device, a wearable device, a network side device in a future 5G network or a network after 5G, or a network device in a future evolved PLMN network.

The core network device 703 corresponds to different devices in different communication systems. For example, the core network device 703 corresponds to a serving GPRS support node (SGSN) and/or a gateway GPRS support node (GGSN) in a 3G system, corresponds to an MME or an S-GW in a 4G system, and corresponds to an access and mobility management function (AMF), a session management function (SMF), or a mobility management entity in a 5G system.

Figure 8:
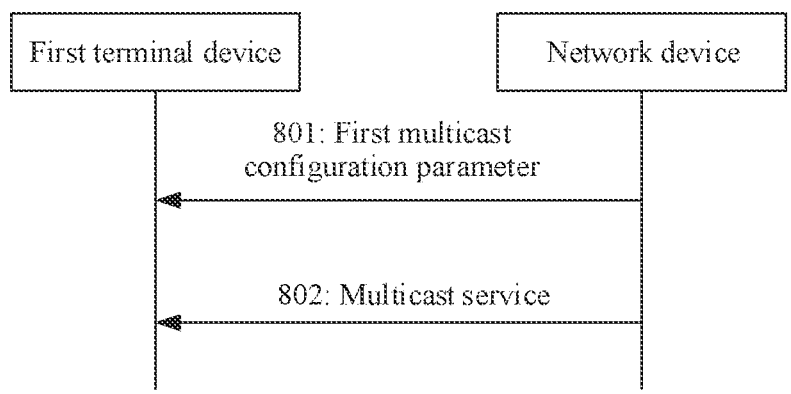
FIG. 8 is a schematic flowchart of a communication method according to an embodiment of this application.

FIG. 8 is a schematic flowchart of a communication method according to an embodiment of this application. A terminal device, an access network device, and a core network device described in FIG. 8 may respectively correspond to the terminal device 701, the network device 702, and the core network device 703 shown in FIG. 7. As shown in FIG. 8, the method includes but is not limited to the following steps.

801: A network device sends a first multicast configuration parameter to a first terminal device.

The first terminal device may be in a connected state, an idle state, or an inactive state.

The first multicast configuration parameter includes a group radio network temporary identifier (G-RNTI) and an identifier of a multicast service. The identifier of the multicast service is used to identify the multicast service. For example, the identifier of the multicast service includes an internet protocol (IP) and/or a port number of the multicast service. The identifier of the multicast service may be sent by an application server to the core network device, and then sent by the core network device to the network device.

Further, the first multicast configuration parameter further includes at least one of the following: BWP information corresponding to the G-RNTI, a PDSCH scrambling sequence of the multicast service, a DRX parameter of the G-RNTI, a demodulation reference signal, and a rate matching reference signal. The BWP information corresponding to the G-RNTI includes at least one of the following: bandwidth, a frequency position, an SCS, a CP length, configuration information related to a CORSET, and configuration information related to a PDSCH. COREST information is used to indicate a time frequency resource on which a PDCCH used for the G-RNTI is located. The PDSCH scrambling sequence of the multicast service is used by the first terminal device in the connected state, the idle state, or the inactive state to descramble the PDSCH of the multicast service by using the PDSCH scrambling sequence. The DRX parameter of the G-RNTI is used by the first terminal device in the connected state, the idle state, or the inactive state to perform G-RNTI detection by using the DRX parameter. The demodulation reference signal is used by the first terminal device in the connected state, the idle state, or the inactive state to demodulate, by using the demodulation reference signal, the PDSCH scheduled by using the G-RNTI. The rate matching reference signal is used by the first terminal device in the connected state, the idle state, or the inactive state to exclude, when receiving the PDSCH scheduled by using the G-RNTI, a position corresponding to the demodulation reference signal.

802: The first terminal device in the idle state or the inactive state receives the multicast service based on the first multicast configuration parameter.

Before that the first terminal device in the idle state or the inactive state receives the multicast service based on the first multicast configuration parameter, the method further includes: The first terminal device obtains the first multicast configuration parameter.

For descriptions of the first multicast configuration parameter, refer to step 801. Details are not described herein again.

It can be learned that, in the foregoing technical solution, the terminal device in the idle state or the inactive state obtains the multicast service.

Figure 9:
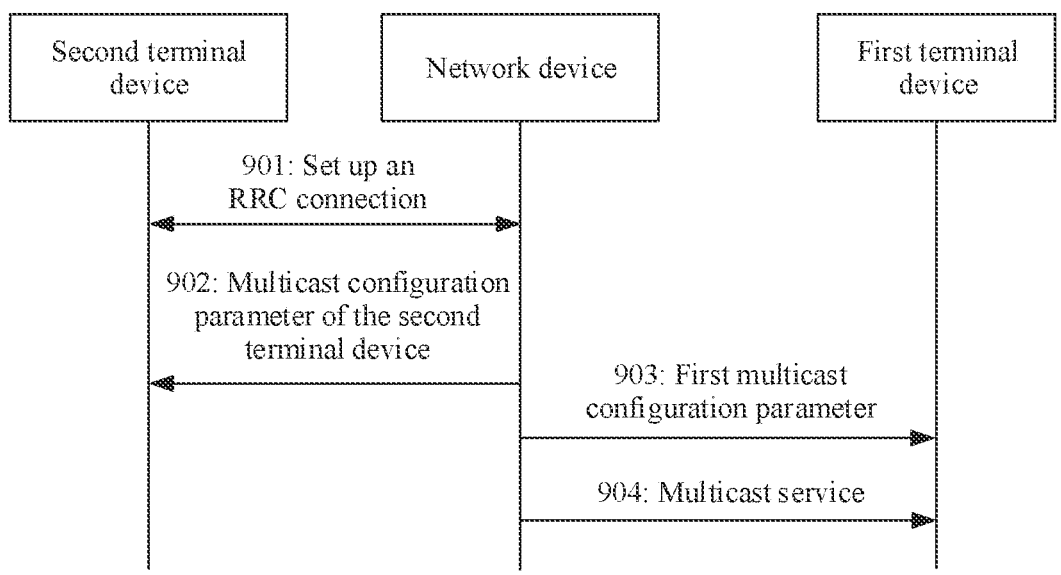
FIG. 9 is a schematic flowchart of another communication method according to an embodiment of this application.

FIG. 9 is a schematic flowchart of another communication method according to an embodiment of this application. A terminal device, an access network device, and a core network device described in FIG. 9 may respectively correspond to the terminal device 701, the network device 702, and the core network device 703 shown in FIG. 7. As shown in FIG. 9, the method includes but is not limited to the following steps.

901: A second terminal device sets up an RRC connection to a network device.

The second terminal device is different from a first terminal device. Specifically, a process of setting up the RRC connection is similar to that in a conventional technology. For example, the terminal device sends an RRC connection setup request to the network device, and the network device sends RRC connection setup to the terminal device. After receiving an RRC connection setup message, the terminal device sets up an RRC signaling connection.

902: The network device sends a multicast configuration parameter of the second terminal device to the second terminal device through the RRC connection.

Specifically, the second terminal device sets up a DRB with the network device, and the DRB is used to transmit a multicast service. A process of setting up the DRB is similar to that in the conventional technology. For example, the core network device sends a quality of service (QoS) parameter of the multicast service to the network device, and the network device sets up the DRB for the terminal device based on the QoS parameter. A configuration parameter of the DRB may include at least one of the following: a first PDCP layer configuration parameter, a first RLC layer configuration parameter, a first MAC layer configuration parameter, and a first PHY layer parameter. The multicast service may be sent to the second terminal device in a unicast manner or in a multicast manner.

The configuration parameter of the DRB may be sent in the unicast manner. The network device may send the multicast configuration parameter of the second terminal device to the second terminal device. The multicast configuration parameter of the second terminal device is a multicast configuration parameter used when the network device sends, in the multicast manner, the multicast service corresponding to the DRB. Further, the network device may further configure, for the second terminal device, an identifier of the multicast service corresponding to the DRB, so that the second terminal device can determine the identifier of the multicast service sent by the DRB.

The multicast configuration parameter of the second terminal device may include at least one of the following: a second RLC layer configuration parameter and a second MAC layer parameter that are used to send the multicast service in the multicast manner.

The first PDCP layer configuration parameter may be used for both sending in the unicast manner and sending in the multicast manner. Optionally, the first RLC layer configuration parameter may be used for both sending in the unicast manner and sending in the multicast manner. When the first RLC layer configuration parameter is used for sending in the multicast manner, the multicast configuration parameter of the second terminal device may not include the second RLC layer configuration parameter.

The first PDCP layer configuration parameter may include a PDCP sequence number length, a ciphering parameter, a header compression parameter, and the like. The first RLC layer configuration parameter and the second RLC layer configuration parameter may each include a logical channel number, an RLC sequence number length, an RLC mode, and the like. The RLC mode may be an acknowledge mode (AM), an unacknowledge mode (UM), or a transparent mode (TM). The first MAC layer configuration parameter and the second MAC layer parameter may each include a DRX parameter, an uplink scheduling request (SR) parameter, and the like. A first PHY layer configuration parameter may include a power control parameter, a HARQ feedback parameter, a CSI feedback parameter, and the like.

The multicast configuration parameter of the second terminal device further includes a group radio network temporary identifier (G-RNTI). The G-RNTI is used to schedule the multicast service. Further, the identifier of the multicast service is configured by the network device for the second terminal device. Further, the multicast configuration parameter of the second terminal device further includes at least one of the following: BWP information corresponding to the G-RNTI, a PDSCH scrambling sequence of the multicast service, a DRX parameter of the G-RNTI, a demodulation reference signal, and a rate matching reference signal. The BWP information corresponding to the G-RNTI includes at least one of the following: bandwidth, a frequency position, an SCS, a CP length, configuration information related to a CORSET, and configuration information related to a PDSCH. COREST information is used to indicate a time frequency resource on which a PDCCH used for the G-RNTI is located. The PDSCH scrambling sequence of the multicast service is used by the second terminal device to descramble the PDSCH of the multicast service by using the PDSCH scrambling sequence. The DRX parameter of the G-RNTI is used by the second terminal device to perform G-RNTI detection by using the DRX parameter. The demodulation reference signal is used by the second terminal device to demodulate, by using the demodulation reference signal, the PDSCH scheduled by using the G-RNTI. The rate matching reference signal is used by the second terminal device to exclude, when receiving the PDSCH scheduled by using the G-RNTI, a position corresponding to the demodulation reference signal.

903: The network device sends the first multicast configuration parameter to the first terminal device through a common channel.

Optionally, in a possible implementation, the first multicast configuration parameter is determined based on the multicast configuration parameter of the second terminal device, the second terminal device is in a connected state, and the second terminal device and the first terminal device are served by a same network device.

It may be understood that both the second terminal device and the first terminal device are located in a service coverage area of the same network device or a sector antenna of the same network device, or located in a same cell or coverage of a same beam of the same network device.

Further, the first multicast configuration parameter may include the G-RNTI in the multicast configuration parameter of the second terminal device. The first multicast configuration parameter may further include at least one of the following: the BWP information corresponding to the G-RNTI in the multicast configuration parameter of the second terminal device, the PDSCH scrambling sequence of the multicast service in the multicast configuration parameter of the second terminal device, the DRX parameter of the G-RNTI in the multicast configuration parameter of the second terminal device, the demodulation reference signal in the multicast configuration parameter of the second terminal device, and the rate matching reference signal in the multicast configuration parameter of the second terminal device. The first multicast configuration parameter may further include at least one of the following: a third PDCP layer configuration parameter, a third RLC layer configuration parameter, and a third MAC layer configuration parameter.

The third PDCP layer configuration parameter may include a PDCP sequence number length, a ciphering parameter, a header compression parameter, and the like. The third RLC layer configuration parameter may include a logical channel number, an RLC sequence number length, an RLC mode, and the like. The RLC mode may be an acknowledge mode (AM), an unacknowledge mode (UM), or a transparent mode (TM). A third MAC layer parameter may include a DRX parameter, an SR parameter, and the like.

The network device may periodically send the first multicast configuration parameter to the first terminal device through the common channel.

The common channel includes a BCCH and/or an MCCH.

It may be understood that the first terminal device in an idle state or an inactive state receives the first multicast configuration parameter from the network device through the common channel. Further, the common channel includes the BCCH, and the first terminal device in the idle state or the inactive state receives the BCCH by using a system information RNTI (SI-RNTI), to obtain the first multicast configuration parameter sent by the network device. The common channel includes the MCCH, and the first terminal device in the idle state or the inactive state receives the MCCH by using a multicast control channel RNTI (MCCH-RNTI), to obtain the first multicast configuration parameter sent by the network device. It may be understood that both the SI-RNTI and the MCCH-RNTI may be allocated by the network device to the first terminal device in the idle state or the inactive state, or may be fixed in a protocol.

It can be learned that the multicast configuration parameter from the network device is received through the common channel, so that the terminal device in the idle state or the inactive state obtains the multicast configuration parameter.

Optionally, in a possible implementation, the network device sends a second multicast configuration parameter to the first terminal device by using the G-RNTI, where the second multicast configuration parameter is scrambled by using the G-RNTI, and the second multicast configuration parameter is different from the first multicast configuration parameter. The network device sends the multicast service based on the second multicast configuration parameter.

The network device sends, by using the G-RNTI, the second multicast configuration parameter to the first terminal device through the common channel. The common channel includes the BCCH and/or the MCCH.

Further, the network device schedules the second multicast configuration parameter by using the G-RNTI, and the second multicast configuration parameter is an updated first multicast configuration parameter that does not include the G-RNTI. In other words, the network device does not update the G-RNTI. Further, the second multicast configuration parameter may further include information about stopping the multicast service.

Further, when entering a new cell, the first terminal device in the idle state or the inactive state needs to re-enter the connected state in the new cell, and then obtains the multicast configuration parameter, to obtain the multicast service based on the multicast configuration parameter. For example, when entering the new cell, the first terminal device in the idle state or the inactive state triggers RRC connection setup or RRC connection resume to set up a new connection.

Further, the network device sends a connection release message to the first terminal device, where the connection release message may further carry indication information of a multicast parameter validity area. After entering the idle state or the inactive state, the first terminal device in the idle state or an active state still belongs to the multicast parameter validity area when entering the new cell. In this case, the first terminal device may continue to receive the multicast service based on the first multicast configuration parameter.

It may be understood that the first terminal device in the idle state or the inactive state receives the second multicast configuration parameter from the network device by using the G-RNTI, where the second multicast configuration parameter is scrambled by using the G-RNTI, and the second multicast configuration parameter is different from the first multicast configuration parameter. The first terminal device in the idle state or the inactive state receives the multicast service based on the second multicast configuration parameter. The second multicast configuration parameter is used to notify the first terminal that the multicast service is stopped or that the first multicast configuration parameter needs to be updated.

Further, the first terminal device in the idle state or the inactive state receives, by using the G-RNTI, the second multicast configuration parameter from the network device through the common channel. The common channel includes the BCCH, and the first terminal device in the idle state or the inactive state receives the BCCH by using a system information RNTI, to obtain the second multicast configuration parameter sent by the network device. The common channel includes the MCCH, and the first terminal device in the idle state or the inactive state receives the MCCH by using a multicast control channel RNTI, to obtain the second multicast configuration parameter sent by the network device.

It can be learned that, when the first multicast configuration parameter is updated to the second multicast configuration parameter, the terminal device receives the second multicast configuration parameter from the network device by using the G-RNTI, so that the multicast service is received based on the second multicast configuration parameter. In this way, the terminal device in the idle state or the inactive state obtains the multicast service.

Optionally, in a possible implementation, before that the network device sends the first multicast configuration parameter to the first terminal device through a common channel, the method further includes: The network device receives indication information sent by the first terminal device, where the indication information is used to request information about a multicast service currently performed by the network device.

It may be understood that the network device may send the first multicast configuration parameter through the common channel based on the indication information of the first terminal device. To be specific, before that the first terminal device receives the first multicast configuration parameter from the network device through the common channel, the method further includes: The first terminal device sends indication information to the network device, where the indication information is used to request information about a multicast service currently performed by the network device. Further, when the first terminal device in the idle state or the inactive state sends the indication information to the network device, the network device sends the first multicast configuration parameter to the first terminal device through the common channel after receiving the indication information sent by the first terminal device.

The indication information may be a preamble sequence.

For example, when a terminal device in the idle state or the inactive state does not determine whether the network device or the cell provides the multicast service, the terminal device in the idle state or the inactive state may first send the indication information to the network device, so that the network device sends the first multicast configuration parameter through the common channel.

It can be learned that, the network device receives, before sending the multicast configuration parameter to the terminal device through the common channel, the indication information sent by the terminal device, so that the network device sends the multicast configuration parameter through the common channel after receiving the indication information sent by the terminal device. In this way, the terminal device in the idle state or the inactive state obtains the multicast configuration parameter.

904: The first terminal device in the idle state or the inactive state receives the multicast service based on the first multicast configuration parameter.

To be specific, the network device sends the multicast service based on the first multicast configuration parameter, so that the first terminal device in the idle state or the inactive state receives the multicast service based on the first multicast configuration parameter.

Optionally, in a possible implementation, the method further includes: The first terminal device receives a connection request from the network device, where the connection request is used to request the first terminal device to enter the connected state. The first terminal device determines, based on the connection request, whether to enter the connected state.

To be specific, the first terminal device in the idle state or the inactive state receives the connection request from the network device, and determines, based on the connection request, whether to enter the connected state.

It can be learned that, when receiving the connection request from the network device, the terminal device in the idle state or the inactive state may determine, based on the connection request, whether to enter the connected state, so that a large quantity of terminal devices in the idle state or the inactive state are prevented from simultaneously accessing the network device.

Optionally, in a possible implementation, that the first terminal device determines, based on the connection request, whether to enter the connected state includes: The first terminal device determines to enter the connected state when at least one of the following conditions is met: a first value randomly selected by the first terminal device from a first value range is less than a first random factor threshold; quality of a reference signal measured by the first terminal device is less than an access threshold; a quality of service indicator of the multicast service corresponding to the first terminal device is greater than a quality of service threshold; or current battery power of the first terminal device is greater than specified battery power.

The first random factor threshold is associated with a quantity of terminal devices that are allowed by the network device to enter the connected state. For example, the first value range is 0 to 1. Assuming that the first value randomly selected by the first terminal device is 0.3, and the first random factor threshold is 0.5, it can be learned that 0.3 is less than 0.5. Therefore, the first terminal device determines to enter the connected state.

Further, the reference signal includes one of the following: a synchronization signal block (SSB), a secondary synchronization signal (SSS), a channel state information reference signal (CSI-RS), and the like. Further, the quality of the reference signal measured by the first terminal device includes one of the following: reference signal received power (RSRP), reference signal received quality (RSRQ), a pilot channel (receive signal channel power, RSCP), and the like. For example, for the access threshold, the RSRP is −80 dBm. It is assumed that, when the quality of the reference signal measured by the first terminal device is less than −80 dBm, the first terminal device determines to enter the connected state.

Further, the quality of service indicator of the multicast service corresponding to the first terminal device is a quality of service (QoS) indicator.

Further, the first random factor threshold, the access threshold, the quality of service threshold, and the specified battery power may all be configured by the network device, or may all be preset.

In addition, even if the network device does not send the connection request to the first terminal device, the first terminal device in the idle state or the inactive state may send the connection request to the network device when determining that the quality of the measured reference signal is less than the access threshold. This improves reliability of receiving the multicast service by the terminal device. For example, a terminal measures the RSRQ, and quality of the RSRQ is lower than −110 dBm. In this case, the terminal sends the connection request to the network device, to set up or resume a connection to the network device.

It can be learned that, the condition for determining, by the first terminal device, to enter the connected state is set, so that a large quantity of terminal devices in the idle state or the inactive state are prevented from simultaneously accessing the network device.

Optionally, in a possible implementation, the method further includes: The network device sends a connection request to the first terminal device, where the connection request is used to request the first terminal device to enter the connected state.

That the network device sends a connection request to the first terminal device includes: When a resource of the network device is greater than a preset resource or a quantity of terminal devices in the connected state is less than a preset quantity, the network device sends the connection request to the first terminal device through the BCCH, the MCCH, or the PDCCH. Further, the resource of the network device includes a storage resource of the network device or a radio resource of the network device. The preset resource and the preset quantity are set by an administrator. It may be understood that the network device may send the connection request to the terminal device, and the terminal device in the idle state or the inactive state may determine, based on the connection request, whether to enter the connected state.

It can be learned that the network device sends the connection request to the first terminal device, where the connection request is used to request the first terminal device to enter the connected state, so that the terminal device enters the connected state. This improves efficiency of receiving the multicast service.

It can be learned that, in the foregoing technical solution, the first multicast configuration parameter is determined based on the multicast configuration parameter of the second terminal device, and the terminal device in the idle state or the inactive state obtains the multicast service.

Figure 10:
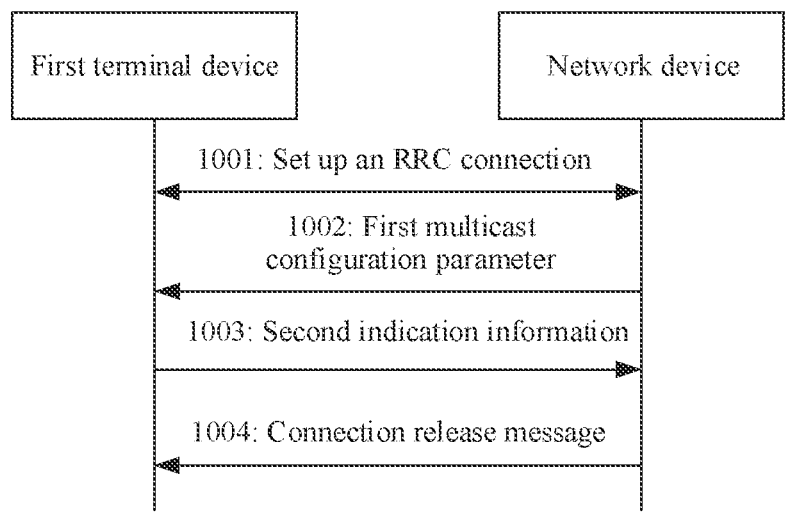
FIG. 10 is a schematic flowchart of another communication method according to an embodiment of this application.

FIG. 10 is a schematic flowchart of another communication method according to an embodiment of this application. A terminal device, an access network device, and a core network device described in FIG. 10 may respectively correspond to the terminal device 701, the network device 702, and the core network device 703 shown in FIG. 7. As shown in FIG. 10, the method includes but is not limited to the following steps.

1001: A first terminal device sets up an RRC connection to a network device.

Specifically, a process of setting up the RRC connection is similar to that in the conventional technology. For example, a terminal device sends an RRC connection setup request to the network device, and the network device sends RRC connection setup to the terminal device. After receiving an RRC connection setup message, the terminal device sets up an RRC signaling connection.

1002: The network device sends a first multicast configuration parameter to the first terminal device through the RRC connection that is set up.

Specifically, the first terminal device sets up a DRB with the network device, and the DRB is used to transmit a multicast service. A process of setting up the DRB is similar to that in the conventional technology. For example, the core network device sends a quality of service (QoS) parameter of the multicast service to the network device, and the network device sets up the DRB for the terminal device based on the QoS parameter. The network device may send a multicast configuration parameter to the terminal device. Further, the network device may further configure, for the terminal device, an identifier of the multicast service corresponding to the DRB, so that the terminal device can receive the multicast service by using the DRB. A configuration parameter of the DRB may include at least one of the following: a first PDCP layer configuration parameter, a first RLC layer configuration parameter, a first MAC layer configuration parameter, and a first PHY layer parameter. The multicast service may be sent to the first terminal device in a unicast manner or in a multicast manner.

The configuration parameter of the DRB may be sent in the unicast manner. The network device may send the first multicast configuration parameter to the first terminal device. The first multicast configuration parameter is a multicast configuration parameter used when the network device sends, in the multicast manner, the multicast service corresponding to the DRB. Further, the network device may further configure, for the first terminal device, the identifier of the multicast service corresponding to the DRB, so that the first terminal device can determine the identifier of the multicast service sent by the DRB.

The multicast configuration parameter of the first terminal device may include at least one of the following: a second RLC layer configuration parameter and a second MAC layer parameter that are used to send the multicast service in the multicast manner.

The first PDCP layer configuration parameter may be used for both sending in the unicast manner and sending in the multicast manner. Optionally, the first RLC layer configuration parameter may be used for both sending in the unicast manner and sending in the multicast manner. When the first RLC layer configuration parameter is used for sending in the multicast manner, the multicast configuration parameter of the second terminal device may not include the second RLC layer configuration parameter.

The first PDCP layer configuration parameter may include a PDCP sequence number length, a ciphering parameter, a header compression parameter, and the like. The first RLC layer configuration parameter and the second RLC layer configuration parameter may each include a logical channel number, an RLC sequence number length, an RLC mode, and the like. The RLC mode may be an acknowledge mode (AM), an unacknowledge mode (UM), or a transparent mode (TM). The first MAC layer configuration parameter and the second MAC layer parameter may each include a DRX parameter, an uplink scheduling request (SR) parameter, and the like. A first PHY layer configuration parameter may include a power control parameter, a HARQ feedback parameter, a CSI feedback parameter, and the like.

The first multicast configuration parameter may further include a group radio network temporary identifier (G-RNTI). Further, the identifier of the multicast service is configured by the network device for the first terminal device.

Further, the first multicast configuration parameter may further include at least one of the following: BWP information corresponding to the G-RNTI, a PDSCH scrambling sequence of the multicast service, a DRX parameter of the G-RNTI, a demodulation reference signal, and a rate matching reference signal. The BWP information corresponding to the G-RNTI includes at least one of the following: bandwidth, a frequency position, an SCS, a CP length, configuration information related to a CORSET, and configuration information related to a PDSCH. COREST information is used to indicate a time frequency resource on which a PDCCH used for the G-RNTI is located. The PDSCH scrambling sequence of the multicast service is used by the first terminal device in a connected state, an idle state, or an inactive state to descramble the PDSCH of the multicast service by using the PDSCH scrambling sequence. The DRX parameter of the G-RNTI is used by the first terminal device in the connected state, the idle state, or the inactive state to perform G-RNTI detection by using the DRX parameter. The demodulation reference signal is used by the first terminal device in the connected state, the idle state, or the inactive state to demodulate, by using the demodulation reference signal, the PDSCH scheduled by using the G-RNTI. The rate matching reference signal is used by the first terminal device in the connected state, the idle state, or the inactive state to exclude, when receiving the PDSCH scheduled by using the G-RNTI, a position corresponding to the demodulation reference signal.

It may be understood that, that the first terminal device obtains the first multicast configuration parameter includes: The first terminal device obtains the first multicast configuration parameter before entering the idle state or the inactive state. To be specific, before entering the idle state or the inactive state, the first terminal device sets up the RRC connection to the network device, and receives, by using the RRC connection that is set up, the first multicast configuration parameter sent by the network device.

It can be learned that the terminal device may alternatively obtain the multicast configuration parameter in the connected state. This diversifies manners of obtaining the multicast configuration parameter.

1003: Optionally, the first terminal device in the connected state sends second indication information to the network device.

The second indication information is used to indicate that the first terminal device has a capability of receiving the multicast service based on the first multicast configuration parameter in the idle state or the inactive state, or is used to indicate the first terminal device to receive the multicast service based on the first multicast configuration parameter in the idle state or the inactive state.

In other words, the network device receives the second indication information sent by the first terminal device.

Further, step 1003 may be performed before step 1002.

1004: The network device sends a connection release message to the first terminal device.

The connection release message includes first indication information, and the first indication information is used to indicate that the first terminal device is allowed to receive the multicast service based on the first multicast configuration parameter after entering the idle state or the inactive state.

Optionally, after receiving the connection release message sent by the network device, the first terminal device enters the idle state or the inactive state. The first terminal device in the idle state or the inactive state reserves the first multicast configuration parameter, and receives the multicast service based on the first multicast configuration parameter. In addition, the first terminal device in the idle state or the inactive state may release a configuration parameter used to receive the multicast service in the unicast manner. For example, the first terminal device may release the first RLC layer configuration parameter when receiving the multicast service based on the first PDCP layer configuration parameter, the second RLC layer configuration parameter, the second MAC layer parameter, and a G-RNTI parameter. Alternatively, the first terminal device may release the first MAC layer configuration parameter when receiving the multicast service based on the first PDCP layer configuration parameter, the first RLC layer configuration parameter, the second MAC layer parameter, and a G-RNTI parameter.

It can be learned that, after receiving the connection release message sent by the network device, the first terminal device enters the idle state or the inactive state. The first terminal device in the idle state or the inactive state reserves the first multicast configuration parameter, receives the multicast service based on the first multicast configuration parameter, and releases the configuration parameter used to receive the multicast service in the unicast manner. In this way, the terminal device in the idle state or the inactive state obtains the multicast service, so that storage pressure of the terminal device is reduced.

Optionally, in a possible implementation, the network device sends a second multicast configuration parameter to the first terminal device by using the G-RNTI, where the second multicast configuration parameter is scrambled by using the G-RNTI, and the second multicast configuration parameter is different from the first multicast configuration parameter. The network device sends the multicast service based on the second multicast configuration parameter.

The network device sends, by using the G-RNTI, the second multicast configuration parameter to the first terminal device through a common channel. The common channel includes a BCCH and/or an MCCH.

Further, the network device schedules the second multicast configuration parameter by using the G-RNTI, and the second multicast configuration parameter is an updated first multicast configuration parameter that does not include the G-RNTI. In other words, the network device does not update the G-RNTI. Further, the second multicast configuration parameter may further include information about stopping the multicast service.

Further, when entering a new cell, the first terminal device in the idle state or the inactive state needs to re-enter the connected state in the new cell, and then obtains the multicast configuration parameter, to obtain the multicast service based on the multicast configuration parameter. For example, when entering the new cell, the first terminal device in the idle state or the inactive state triggers RRC connection setup or RRC connection resume to set up a new connection.

Further, the network device sends a connection release message to the first terminal device, where the connection release message may further carry indication information of a multicast parameter validity area. After entering the idle state or the inactive state, the first terminal device in the idle state or an active state still belongs to the multicast parameter validity area when entering the new cell. In this case, the first terminal device may continue to receive the multicast service based on the first multicast configuration parameter.

It may be understood that the first terminal device in the idle state or the inactive state receives the second multicast configuration parameter from the network device by using the G-RNTI, where the second multicast configuration parameter is scrambled by using the G-RNTI, and the second multicast configuration parameter is different from the first multicast configuration parameter. The first terminal device in the idle state or the inactive state receives the multicast service based on the second multicast configuration parameter. The second multicast configuration parameter is used to notify the first terminal that the multicast service is stopped or that the first multicast configuration parameter needs to be updated.

Further, the first terminal device in the idle state or the inactive state receives, by using the G-RNTI, the second multicast configuration parameter from the network device through the common channel. The common channel includes the BCCH, and the first terminal device in the idle state or the inactive state receives the BCCH by using a system information RNTI, to obtain the second multicast configuration parameter sent by the network device. The common channel includes the MCCH, and the first terminal device in the idle state or the inactive state receives the MCCH by using a multicast control channel RNTI, to obtain the second multicast configuration parameter sent by the network device.

It can be learned that, when the first multicast configuration parameter is updated to the second multicast configuration parameter, the terminal device receives the second multicast configuration parameter from the network device by using the G-RNTI, so that the multicast service is received based on the second multicast configuration parameter. In this way, the terminal device in the idle state or the inactive state obtains the multicast service.

Optionally, the method further includes: The first terminal device receives a connection request from the network device, where the connection request is used to request the first terminal device to enter the connected state. The first terminal device determines, based on the connection request, whether to enter the connected state.

To be specific, the first terminal device in the idle state or the inactive state receives the connection request from the network device, and determines, based on the connection request, whether to enter the connected state.

It can be learned that, when receiving the connection request from the network device, the terminal device in the idle state or the inactive state may determine, based on the connection request, whether to enter the connected state, so that a large quantity of terminal devices in the idle state or the inactive state are prevented from simultaneously accessing the network device.

Optionally, in a possible implementation, that the first terminal device determines, based on the connection request, whether to enter the connected state includes: The first terminal device determines to enter the connected state when at least one of the following conditions is met: a first value randomly selected by the first terminal device from a first value range is less than a first random factor threshold; quality of a reference signal measured by the first terminal device is less than an access threshold; a quality of service indicator of the multicast service corresponding to the first terminal device is greater than a quality of service threshold; or current battery power of the first terminal device is greater than specified battery power.

The first random factor threshold is associated with a quantity of terminal devices that are allowed by the network device to enter the connected state. For example, the first value range is 0 to 1. Assuming that the first value randomly selected by the first terminal device is 0.3, and the first random factor threshold is 0.5, it can be learned that 0.3 is less than 0.5. Therefore, the first terminal device determines to enter the connected state.

Further, the reference signal includes one of the following: a synchronization signal block (SSB), a secondary synchronization signal (SSS), a channel state information reference signal (CSI-RS), and the like. Further, the quality of the reference signal measured by the first terminal device includes one of the following: reference signal received power (RSRP), reference signal received quality (RSRQ), a pilot channel (receive signal channel power. RSCP), and the like. For example, for the access threshold, the RSRP is −80 dBm. It is assumed that, when the quality of the reference signal measured by the first terminal device is less than −80 dBm, the first terminal device determines to enter the connected state.

Further, the quality of service indicator of the multicast service corresponding to the first terminal device is a quality of service (QoS) indicator.

Further, the first random factor threshold, the access threshold, the quality of service threshold, and the specified battery power may all be configured by the network device, or may all be preset.

In addition, even if the network device does not send the connection request to the first terminal device, the first terminal device in the idle state or the inactive state may send the connection request to the network device when determining that the quality of the measured reference signal is less than the access threshold. This improves reliability of receiving the multicast service by the terminal device. For example, a terminal measures the RSRQ, and quality of the RSRQ is lower than −110 dBm. In this case, the terminal sends the connection request to the network device, to set up or resume a connection to the network device.

It can be learned that, the condition for determining, by the first terminal device, to enter the connected state is set, so that a large quantity of terminal devices in the idle state or the inactive state are prevented from simultaneously accessing the network device.

Optionally, in a possible implementation, the method further includes: The network device sends a connection request to the first terminal device, where the connection request is used to request the first terminal device to enter the connected state.

That the network device sends a connection request to the first terminal device includes: When a resource of the network device is greater than a preset resource or a quantity of terminal devices in the connected state is less than a preset quantity, the network device sends the connection request to the first terminal device through the BCCH, the MCCH, or the PDCCH. Further, the resource of the network device includes a storage resource of the network device or a radio resource of the network device. The preset resource and the preset quantity are set by an administrator. It may be understood that the network device may send the connection request to the terminal device, and the terminal device in the idle state or the inactive state may determine, based on the connection request, whether to enter the connected state.

It can be learned that the network device sends the connection request to the first terminal device, where the connection request is used to request the first terminal device to enter the connected state, so that the network device enables the terminal device to enter the connected state. This improves efficiency of receiving the multicast service.

It can be learned that, in the foregoing technical solution, the terminal device that enters the idle state or the inactive state from the connected state receives the multicast service based on the multicast configuration parameter obtained in the connected state.

Figure 11:
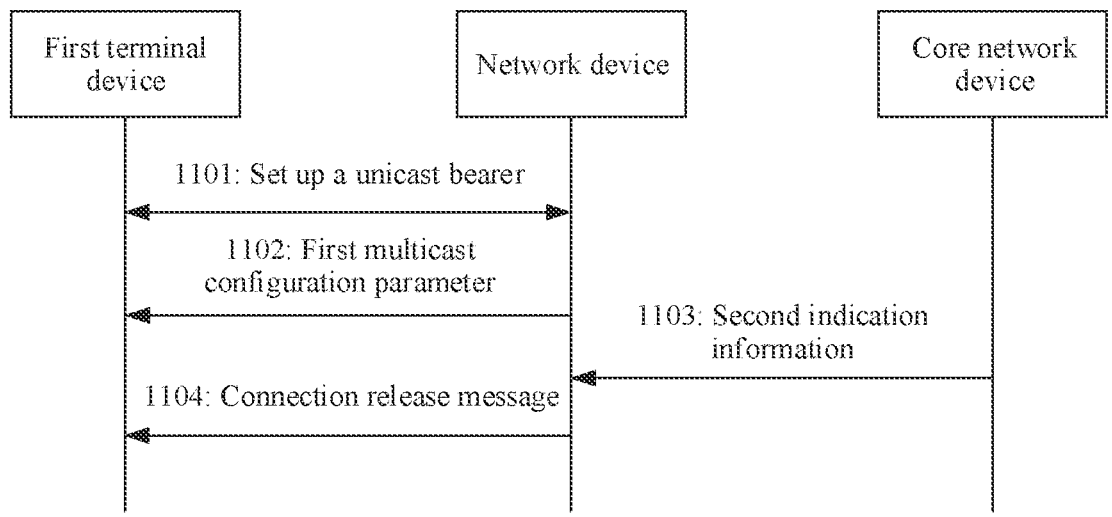
FIG. 11 is a schematic flowchart of another communication method according to an embodiment of this application.

FIG. 11 is a schematic flowchart of another communication method according to an embodiment of this application. A terminal device, an access network device, and a core network device described in FIG. 11 may respectively correspond to the terminal device 701, the network device 702, and the core network device 703 shown in FIG. 7. As shown in FIG. 11, the method includes but is not limited to the following steps.

1101: A first terminal device sets up an RRC connection to a network device.

Reference may be made to 1002 in the embodiment shown in FIG. 10. Details are not described herein again.

1102: The network device sends a first multicast configuration parameter to the first terminal device through the RRC connection.

Reference may be made to 1002 in the embodiment shown in FIG. 10. Details are not described herein again.

1103: The core network device sends second indication information to the network device.

For descriptions of the second indication information, refer to 1003 in the embodiment shown in FIG. 10. Details are not described herein again.

In other words, the network device receives the second indication information sent by the core network device.

Further, step 1103 may be performed before step 1102.

1104: The network device sends a connection release message to the first terminal device.

Reference may be made to 1004 in the embodiment shown in FIG. 10. Details are not described herein again.

It can be learned that, in the foregoing technical solution, a terminal device that enters an idle state or an inactive state from a connected state receives a multicast service based on a multicast configuration parameter obtained in the connected state.

Figure 12:
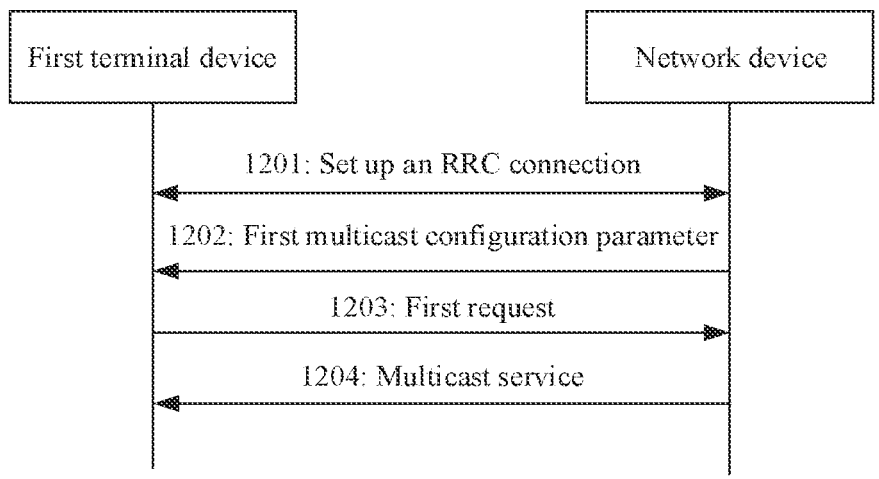
FIG. 12 is a schematic flowchart of another communication method according to an embodiment of this application.

FIG. 12 is a schematic flowchart of another communication method according to an embodiment of this application. A terminal device, an access network device, and a core network device described in FIG. 12 may respectively correspond to the terminal device 701, the network device 702, and the core network device 703 shown in FIG. 7. As shown in FIG. 12, the method includes but is not limited to the following steps.

1201: A first terminal device sets up an RRC connection to a network device.

1202: The network device sends a first multicast configuration parameter to the first terminal device through the RRC connection.

Reference may be made to 1002 in the embodiment shown in FIG. 10. Details are not described herein again.

1203: The first terminal device in a connected state sends a first request to the network device.

The first request is used to request to remain in the connected state.

In other words, the network device receives the first request sent by the first terminal device.

1204: The network device sends the multicast service based on the first multicast configuration parameter.

In other words, the first terminal device in the connected state receives the multicast service based on the first multicast configuration parameter.

It can be learned that, in the foregoing technical solution, the terminal device may send the first request to the network device after entering the connected state, so that the terminal device remains in the connected state. In this way, the network device does not release the terminal device, and the terminal device obtains the multicast service in the connected state.

Figure 13:
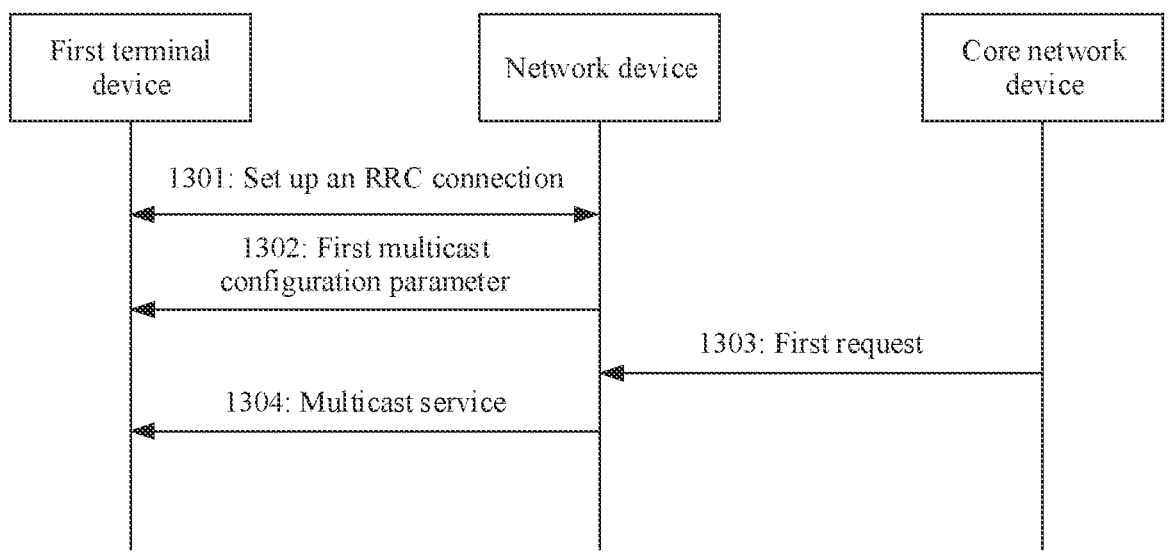
FIG. 13 is a schematic flowchart of another communication method according to an embodiment of this application.

FIG. 13 is a schematic flowchart of another communication method according to an embodiment of this application. A terminal device, an access network device, and a core network device described in FIG. 13 may respectively correspond to the terminal device 701, the network device 702, and the core network device 703 shown in FIG. 7. As shown in FIG. 13, the method includes but is not limited to the following steps.

1301: A first terminal device sets up an RRC connection to a network device.

1302: The network device sends a first multicast configuration parameter to the first terminal device through the RRC connection.

Reference may be made to 1002 in the embodiment shown in FIG. 10. Details are not described herein again.

1303: The core network device sends a first request to the network device.

For descriptions of the first request, refer to 1203 in the embodiment shown in FIG. 12. Details are not described herein again.

In other words, the network device receives the first request sent by the core network device.

1304: The network device sends a multicast service based on the first multicast configuration parameter.

In other words, the first terminal device in a connected state receives the multicast service based on the first multicast configuration parameter.

It can be learned that, in the foregoing technical solution, the core network device may send the first request to the network device, so that the terminal device remains in the connected state. In this way, the network device does not release the terminal device, and the terminal device obtains the multicast service in the connected state.

Figure 14:
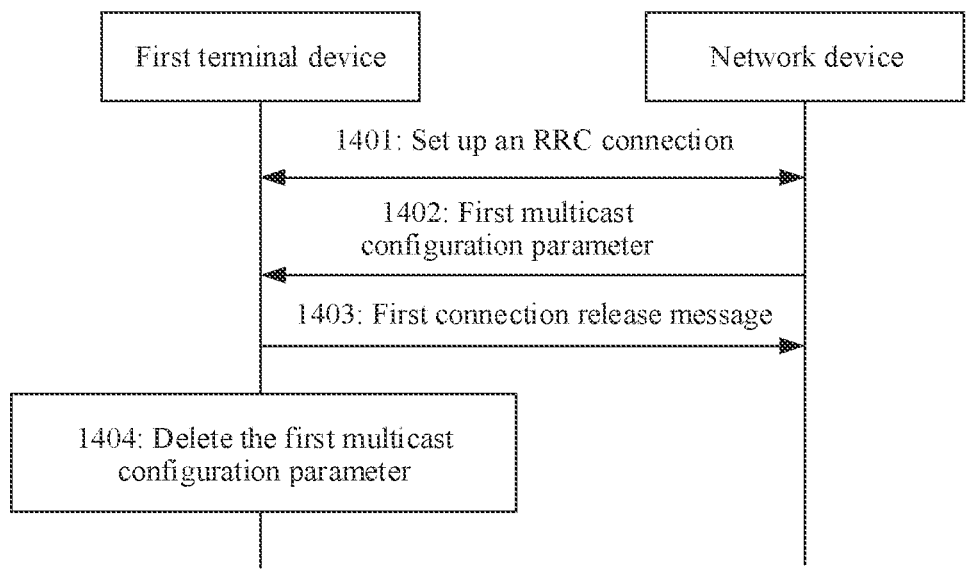
FIG. 14 is a schematic flowchart of another communication method according to an embodiment of this application.

FIG. 14 is a schematic flowchart of another communication method according to an embodiment of this application. A terminal device, an access network device, and a core network device described in FIG. 14 may respectively correspond to the terminal device 701, the network device 702, and the core network device 703 shown in FIG. 7. As shown in FIG. 14, the method includes but is not limited to the following steps.

1401: A first terminal device sets up an RRC connection to a network device.

1402: The network device sends a first multicast configuration parameter to the first terminal device through the RRC connection.

Reference may be made to 1002 in the embodiment shown in FIG. 10. Details are not described herein again.

1403: The network device sends a first connection release message to the first terminal device.

The first connection release message may include third indication information, and the third indication information is used to indicate that the first terminal device is not allowed to receive the multicast service based on the first multicast configuration parameter after entering an idle state or an inactive state. The first connection release message may alternatively not include any indication information.

In other words, the first terminal device in a connected state receives the first connection release message sent by the network device.

1404: The first terminal device in the idle state or the inactive state deletes the first multicast configuration parameter.

It can be learned that, in the foregoing technical solution, after the terminal device enters the connected state, the network device may send the first connection release message to the terminal device, so that the terminal device in the idle state or the inactive state deletes the first multicast configuration parameter. This reduces storage load of the terminal device.

Figure 15:
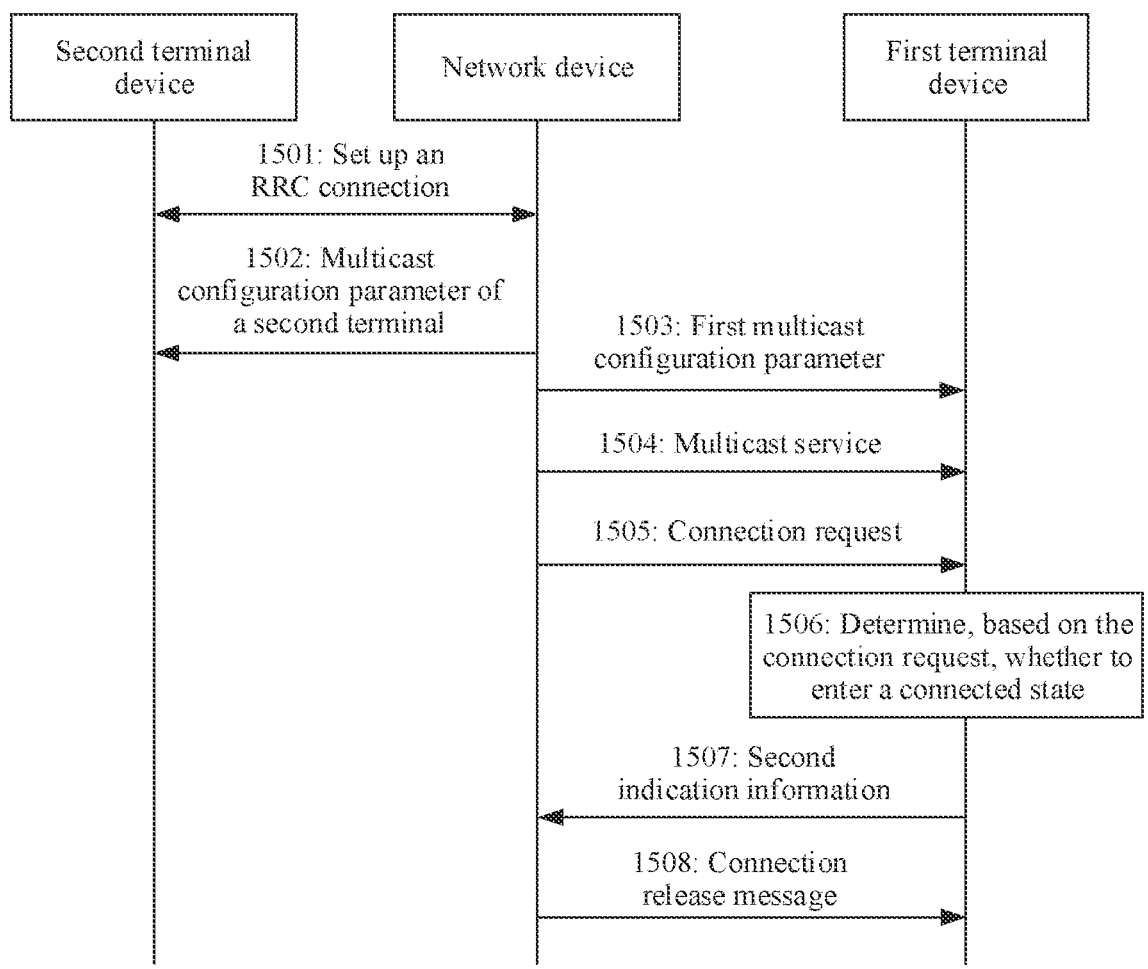
FIG. 15 is a schematic flowchart of another communication method according to an embodiment of this application.

FIG. 15 is a schematic flowchart of another communication method according to an embodiment of this application. A terminal device, an access network device, and a core network device described in FIG. 15 may respectively correspond to the terminal device 701, the network device 702, and the core network device 703 shown in FIG. 7. As shown in FIG. 15, the method includes but is not limited to the following steps.

1501: A second terminal device sets up an RRC connection to a network device.

Reference may be made to 901 in the embodiment shown in FIG. 9. Details are not described herein again.

1502: The network device sends a first multicast configuration parameter to the second terminal device through the RRC connection.

Reference may be made to 902 in the embodiment shown in FIG. 9. Details are not described herein again.

1503: The network device sends the first multicast configuration parameter to a first terminal device through a common channel.

Reference may be made to 903 in the embodiment shown in FIG. 9. Details are not described herein again.

1504: The first terminal device in an idle state or an inactive state receives a multicast service based on the first multicast configuration parameter.

Reference may be made to 904 in the embodiment shown in FIG. 9. Details are not described herein again.

1505: The first terminal device in the idle state or the inactive state receives a connection request from the network device.

Reference may be made to 904 in the embodiment shown in FIG. 9. Details are not described herein again.

1506: The first terminal device in the idle state or the inactive state determines, based on the connection request, whether to enter a connected state.

Reference may be made to 904 in the embodiment shown in FIG. 9. Details are not described herein again.

1507: The first terminal device in the connected state sends second indication information to the network device.

For descriptions of the second indication information, refer to 1003 in the embodiment shown in FIG. 10. Details are not described herein again.

1508: The network device sends a connection release message to the first terminal device.

Reference may be made to 1004 in the embodiment shown in FIG. 10. Details are not described herein again.

It can be learned that, in the foregoing technical solution, the first multicast configuration parameter is determined based on a multicast configuration parameter of the second terminal device, and the terminal device in the idle state or the inactive state obtains the multicast service. In addition, the terminal device in the idle state or the inactive state may determine, based on the connection request, whether to enter the connected state, so that a large quantity of terminal devices in the idle state or the inactive state are prevented from simultaneously accessing the network device. Further, after entering the connected state from the idle state or the inactive state, the terminal device may send the second indication information to the network device, so that the terminal device in the idle state or the inactive state receives the multicast service. When the multicast configuration parameter is updated, the terminal device in the idle state or the inactive state may receive the multicast service based on the updated multicast configuration parameter.

Figure 16:
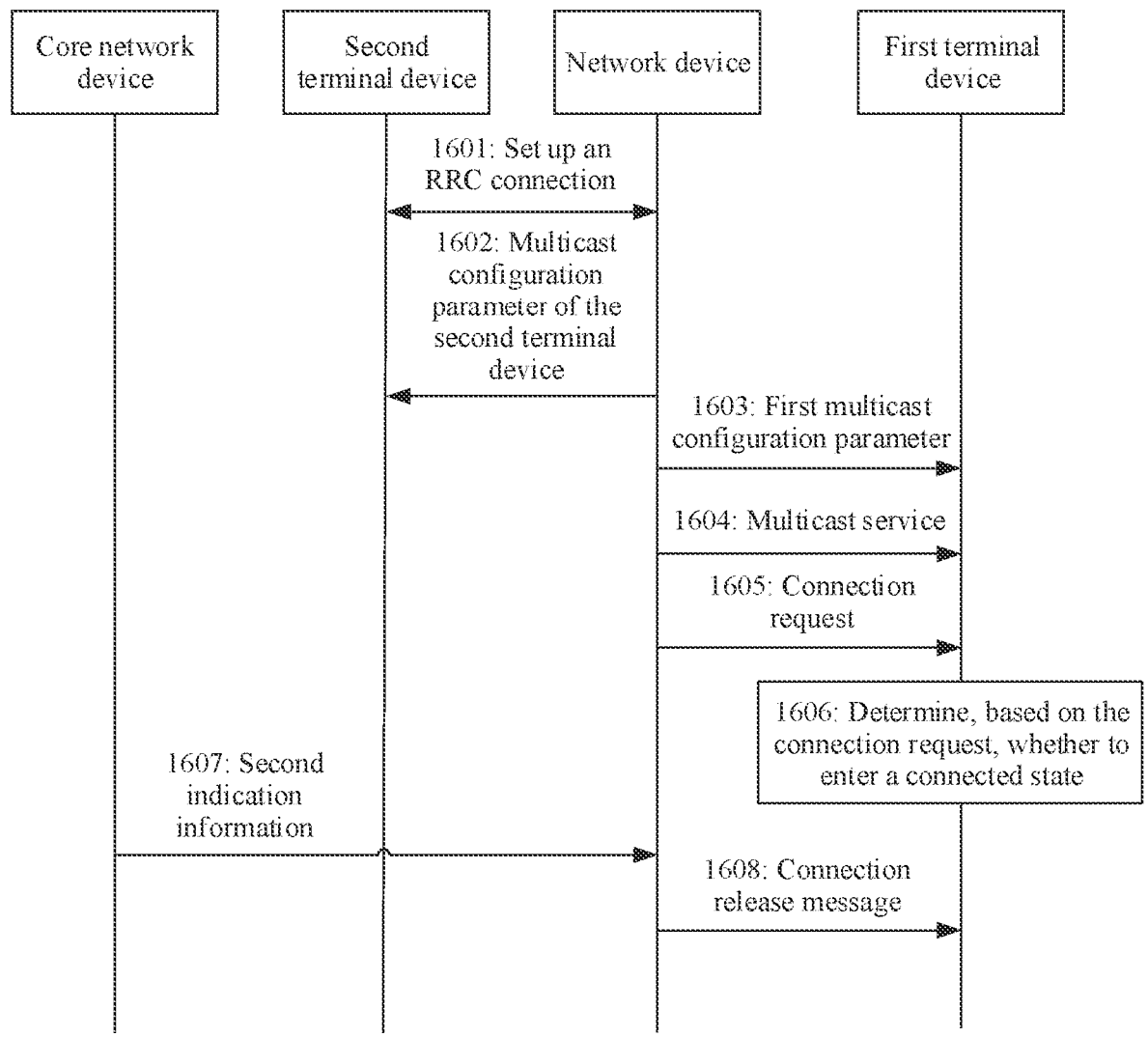
FIG. 16 is a schematic flowchart of another communication method according to an embodiment of this application.

FIG. 16 is a schematic flowchart of another communication method according to an embodiment of this application. A terminal device, an access network device, and a core network device described in FIG. 16 may respectively correspond to the terminal device 701, the network device 702, and the core network device 703 shown in FIG. 7. As shown in FIG. 16, the method includes but is not limited to the following steps.

1601: A second terminal device sets up an RRC connection to a network device.

Reference may be made to 901 in the embodiment shown in FIG. 9. Details are not described herein again.

1602: The network device sends a first multicast configuration parameter to the second terminal device through the RRC connection.

Reference may be made to 902 in the embodiment shown in FIG. 9. Details are not described herein again.

1603: The network device sends the first multicast configuration parameter to a first terminal device through a common channel.

Reference may be made to 903 in the embodiment shown in FIG. 9. Details are not described herein again.

1604: The first terminal device in an idle state or an inactive state receives a multicast service based on the first multicast configuration parameter.

Reference may be made to 904 in the embodiment shown in FIG. 9. Details are not described herein again.

1605: The first terminal device in the idle state or the inactive state receives a connection request from the network device.

Reference may be made to 904 in the embodiment shown in FIG. 9. Details are not described herein again.

1606: The first terminal device in the idle state or the inactive state determines, based on the connection request, whether to enter a connected state.

Reference may be made to 904 in the embodiment shown in FIG. 9. Details are not described herein again.

1607: The core network device sends second indication information to the network device.

Reference may be made to 1103 in the embodiment shown in FIG. 11. Details are not described herein again.

1608: The network device sends a connection release message to the first terminal device.

Reference may be made to 1104 in the embodiment shown in FIG. 11. Details are not described herein again.

It can be learned that, in the foregoing technical solution, the terminal device in the idle state or the inactive state obtains the multicast service. In addition, the terminal device in the idle state or the inactive state may determine, based on the connection request, whether to enter the connected state, so that a large quantity of terminal devices in the idle state or the inactive state are prevented from simultaneously accessing the network device. Further, after the terminal device enters the connected state from the idle state or the inactive state, the core network device may send the second indication information to the network device, so that the terminal device in the idle state or the inactive state receives the multicast service. When a multicast configuration parameter is updated, the terminal device in the idle state or the inactive state may receive the multicast service based on the updated multicast configuration parameter.

Figure 17:
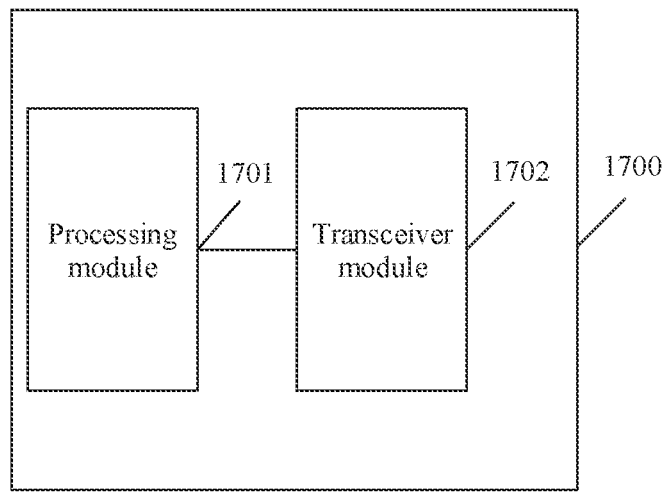
FIG. 17 is a schematic diagram of a structure of a communication apparatus according to an embodiment of this application.

FIG. 17 is a schematic diagram of a structure of a communication apparatus according to an embodiment of this application. The communication apparatus 1700 may be used in the methods shown in FIG. 8 to FIG. 16. The communication apparatus 1700 is a terminal device or a chip in the terminal device. As shown in FIG. 17, the communication apparatus includes a processing module 1701 and a transceiver module 1702.

The processing module 1701 is configured to obtain a first multicast configuration parameter, where the first multicast configuration parameter includes a group radio network temporary identifier (G-RNTI) and an identifier of a multicast service. The transceiver module 1702 is configured to receive the multicast service based on the first multicast configuration parameter.

In a possible implementation, the first multicast configuration parameter is determined based on a multicast configuration parameter of a second terminal device, the second terminal device is in a connected state, and the second terminal device and the communication apparatus are served by a same network device.

In a possible implementation, the transceiver module 1702 is specifically configured to receive the first multicast configuration parameter from a network device through a common channel, where the communication apparatus is in an idle state or an inactive state.

In a possible implementation, the transceiver module 1702 is further configured to send indication information to the network device, where the indication information is used to request information about a multicast service currently performed by the network device.

In a possible implementation, the transceiver module 1702 is specifically configured to obtain the first multicast configuration parameter before the communication apparatus enters the idle state or the inactive state.

In a possible implementation, the transceiver module 1702 is further configured to: receive a connection release message from a network device, where the connection release message includes first indication information, and the first indication information is used to indicate that the communication apparatus is allowed to receive the multicast service based on the first multicast configuration parameter after entering the idle state or the inactive state; and/or send second indication information to the network device, where the second indication information is used to indicate that the communication apparatus has a capability of receiving the multicast service based on the first multicast configuration parameter in the idle state or the inactive state, or is used to indicate the communication apparatus to receive the multicast service based on the first multicast configuration parameter in the idle state or the inactive state.

In a possible implementation, the transceiver module 1702 is further configured to send a first request to the network device, where the first request is used to request to remain in the connected state.

In a possible implementation, the transceiver module 1702 is further configured to: receive a second multicast configuration parameter from the network device by using the G-RNTI, where the second multicast configuration parameter is scrambled by using the G-RNTI, and the second multicast configuration parameter is different from the first multicast configuration parameter; and receive the multicast service based on the second multicast configuration parameter.

In a possible implementation, the transceiver module 1702 is further configured to receive a connection request from the network device, where the connection request is used to request the first terminal device to enter the connected state. The processing module 1701 is specifically configured to determine, based on the connection request, whether to enter the connected state.

In a possible implementation, the processing module 1701 is specifically configured to enter the connected state when at least one of the following conditions is met: a first value randomly selected by the communication apparatus from a first value range is less than a first random factor threshold; quality of a reference signal measured by the communication apparatus is less than an access threshold; a quality of service indicator of the multicast service corresponding to the communication apparatus is greater than a quality of service threshold; or current battery power of the communication apparatus is greater than specified battery power.

For more detailed descriptions of the processing module 1701 and the transceiver module 1702, refer to related descriptions of the terminal device in the method embodiments shown in FIG. 8 to FIG. 16. Details are not described herein.

Figure 18:
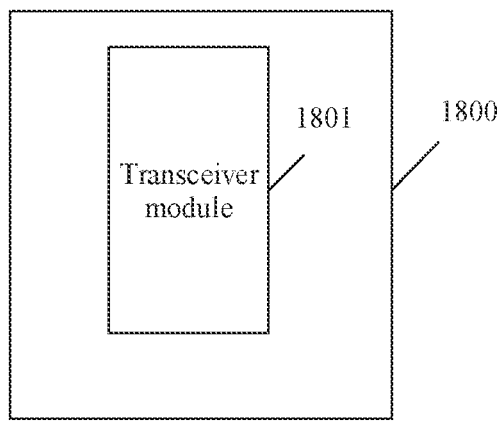
FIG. 18 is a schematic diagram of a structure of another communication apparatus according to an embodiment of this application.

FIG. 18 is a schematic diagram of a structure of another communication apparatus according to an embodiment of this application. The communication apparatus 1800 may be used in the methods shown in FIG. 8 to FIG. 16. The communication apparatus 1800 is a network device or a chip in the network device. As shown in FIG. 18, the communication apparatus includes a transceiver module 1801.

The transceiver module 1801 is configured to: send a first multicast configuration parameter to a first terminal device, where the first multicast configuration parameter includes a group radio network temporary identifier (G-RNTI) and an identifier of a multicast service; and send the multicast service based on the first multicast configuration parameter.

In a possible implementation, the first multicast configuration parameter is determined based on a multicast configuration parameter of a second terminal device, the second terminal device is in a connected state, and the second terminal device and the first terminal device are served by a same network device.

In a possible implementation, the transceiver module 1801 is specifically configured to send the first multicast configuration parameter to the first terminal device through a common channel.

In a possible implementation, the transceiver module 1801 is further configured to receive indication information sent by the first terminal device, where the indication information is used to request information about a multicast service currently performed by the network device.

In a possible implementation, the transceiver module 1801 is further configured to: send a connection release message to the first terminal device, where the connection release message includes first indication information, and the first indication information is used to indicate that the first terminal device is allowed to receive the multicast service based on the first multicast configuration parameter after entering an idle state or an inactive state, and/or receive second indication information sent by the first terminal device, where the second indication information is used to indicate that the first terminal device has a capability of receiving the multicast service based on the first multicast configuration parameter in the idle state or the inactive state, or is used to indicate the first terminal device to receive the multicast service based on the first multicast configuration parameter in the idle state or the inactive state.

In a possible implementation, the transceiver module 1801 is further configured to receive a first request sent by the first terminal device, where the first request is used to request to remain in the connected state.

In a possible implementation, the transceiver module 1801 is further configured to: send a second multicast configuration parameter to the first terminal device by using the G-RNTI, where the second multicast configuration parameter is scrambled by using the G-RNTI, and the second multicast configuration parameter is different from the first multicast configuration parameter; and send the multicast service based on the second multicast configuration parameter.

In a possible implementation, the transceiver module 1801 is further configured to send a connection request to the first terminal device, where the connection request is used to request the first terminal device to enter the connected state.

For more detailed descriptions of the transceiver module 1801, refer to related descriptions of the network device in the method embodiments shown in FIG. 8 to FIG. 16. Details are not described herein.

An embodiment of this application further provides a terminal device/network device. The terminal device/network device is configured to perform the foregoing communication methods. Some or all of the foregoing communication methods may be implemented by using hardware or software.

Optionally, in specific implementation, the communication apparatus may be a chip or an integrated circuit.

Optionally, when some or all of the communication methods in embodiments are implemented by using software, the terminal device/network device includes at least one processor, configured to execute a program. When the program is executed, the terminal device/network device is enabled to implement the communication methods provided in embodiments. The terminal device/network device may further include a memory, configured to store a necessary program. The related program may be loaded into the memory when the terminal device/network device is delivered from a factory, or may be loaded into the memory when needed later.

Optionally, the memory may be a physically independent unit, or may be integrated with the processor.

Optionally, when some or all of the communication methods in embodiments are implemented by using software, the terminal device/network device may alternatively include only at least one processor. A memory configured to store a program is located outside the terminal device/network device, and the processor is connected to the memory by using a circuit/cable, to read and execute the program stored in the memory.

Each processor may be a central processing unit (CPU), a network processor (NP), or a combination of a CPU and an NP.

Optionally, each processor may include a hardware chip. The hardware chip may be an application-specific integrated circuit (ASIC), a programmable logic device (PLD), or a combination thereof. The PLD may be a complex programmable logic device (CPLD), a field programmable gate array (FPGA), generic array logic (GAL), or any combination thereof.

The memory may include a volatile memory, for example, a random access memory (RAM); or the memory may include a non-volatile memory, for example, a flash memory, a hard disk drive (HDD), or a solid-state drive (SSD); or the memory may include a combination of the foregoing types of memories.

Figure 19:
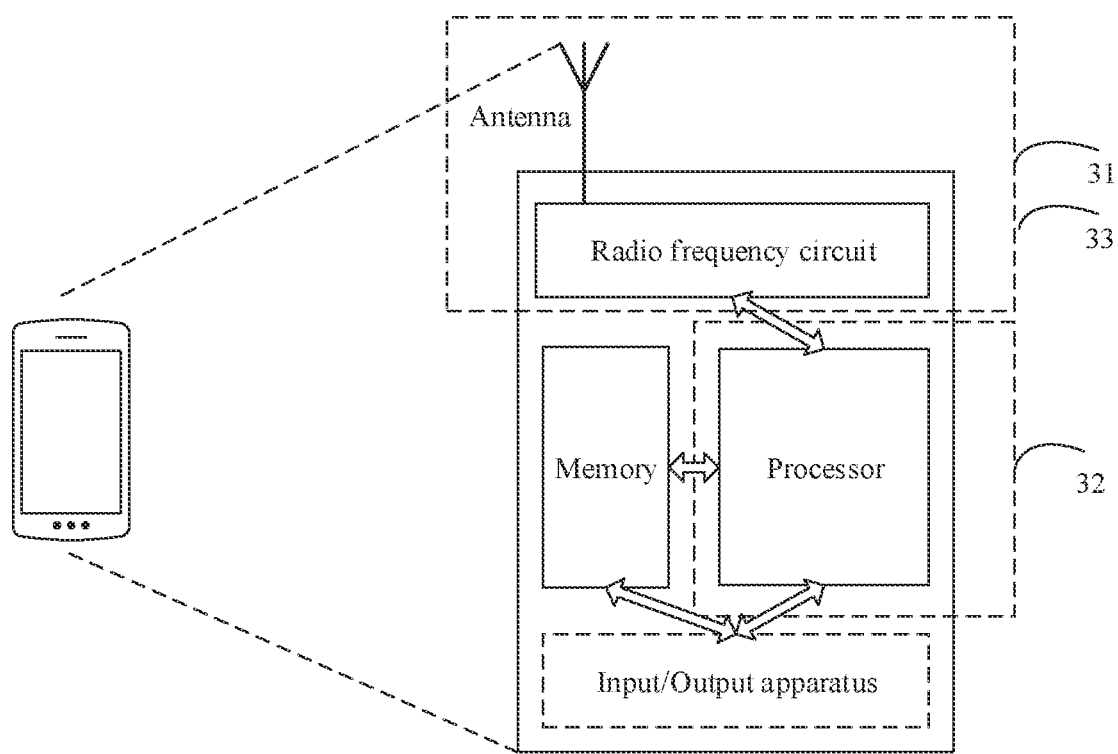
FIG. 19 is a schematic diagram of a structure of a simplified terminal device according to an embodiment of this application.

FIG. 19 is a schematic diagram of a structure of a simplified terminal device according to an embodiment of this application. For ease of understanding and illustration, an example in which a terminal device is a mobile phone is used in FIG. 19. As shown in FIG. 19, the terminal device includes at least one processor, and may further include a radio frequency circuit, an antenna, and an input/output apparatus. The processor may be configured to process a communication protocol and communication data, and may be further configured to: control the terminal device, execute a software program, process data of the software program, and the like. The terminal device may further include a memory. The memory is mainly configured to store the software program and the data. The related program may be loaded into the memory when the communication apparatus is delivered from a factory, or may be loaded into the memory when needed later. The radio frequency circuit is mainly configured to: perform conversion between a baseband signal and a radio frequency signal, and process the radio frequency signal. The antenna is mainly configured to send and receive a radio frequency signal in a form of an electromagnetic wave. The input/output apparatus, for example, a touchscreen, a display, or a keyboard, is mainly configured to: receive data entered by a user and output data to the user. It should be noted that some types of terminal devices may not have the input/output apparatus.

When data needs to be sent, the processor performs baseband processing on the to-be-sent data, and outputs a baseband signal to the radio frequency circuit. The radio frequency circuit performs radio frequency processing on the baseband signal, and sends a radio frequency signal through the antenna in a form of an electromagnetic wave. When data is sent to the terminal device, the radio frequency circuit receives the radio frequency signal through the antenna, converts the radio frequency signal into a baseband signal, and outputs the baseband signal to the processor, and the processor converts the baseband signal into data and processes the data. For ease of description, only one memory and one processor are shown in FIG. 19. In an actual terminal device product, there may be one or more processors and one or more memories. The memory may also be referred to as a storage medium, a storage device, or the like. The memory may be disposed independently of the processor, or may be integrated with the processor. This is not limited in this embodiment of this application.

In this embodiment of this application, an antenna having sending and receiving functions and the radio frequency circuit may be considered as a receiving unit and a sending unit (which may also be collectively referred to as a transceiver unit) of the terminal device, and a processor having a processing function may be considered as a processing unit of the terminal device. As shown in FIG. 19, the terminal device includes a receiving module 31, a processing module 32, and a sending module 33. The receiving module 31 may also be referred to as a receiver, a receiver circuit, or the like. The sending module 33 may also be referred to as a transmitter, a transmitter circuit, or the like. The processing module 32 may also be referred to as a processor, a processing board, a processing apparatus, or the like.

For example, in an embodiment, the receiving module 31 is configured to perform a function of the terminal device in step 904 in the embodiment shown in FIG. 9. The processing module 32 is configured to perform a function of the terminal device in step 906 in the embodiment shown in FIG. 9. The sending module 33 is configured to perform a function of the terminal device in step 903 in the embodiment shown in FIG. 9.

For another example, in an embodiment, the receiving module 31 is configured to perform a function of the terminal device in steps 1002, 1004, and 1007 in the embodiment shown in FIG. 10. The processing module 32 is configured to perform a function of the terminal device in steps 1001 and 1004 in the embodiment shown in FIG. 10. The sending module 33 is configured to perform a function of the terminal device in step 1003 in the embodiment shown in FIG. 10.

Figure 20:
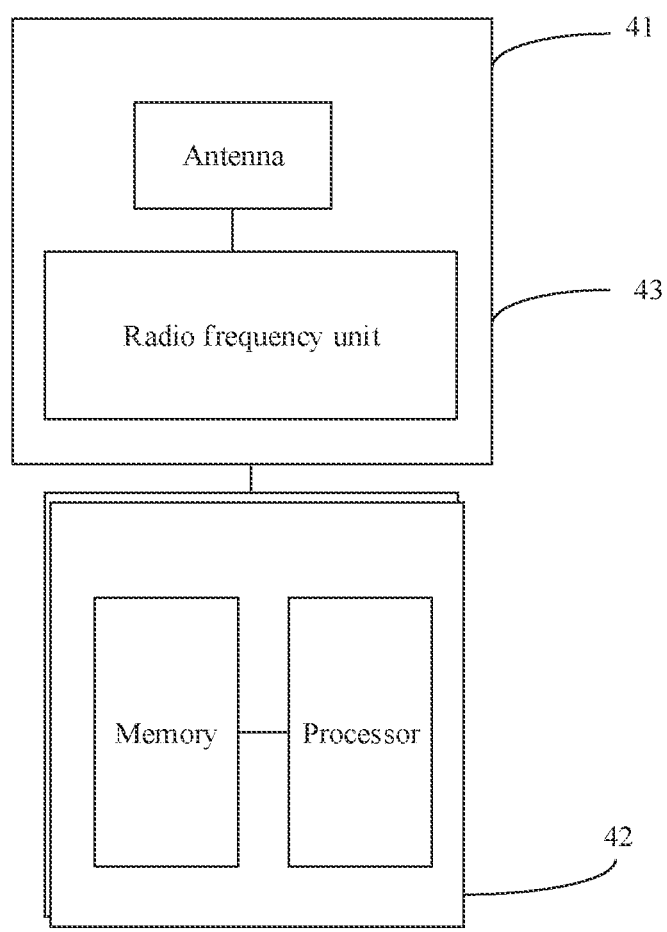
FIG. 20 is a schematic diagram of a structure of a simplified network device according to an embodiment of this application.

FIG. 20 is a schematic diagram of a structure of a simplified network device according to an embodiment of this application. The network device includes a part 42 and a part for radio frequency signal transmission/reception and conversion. The part for radio frequency signal transmission/reception and conversion further includes a receiving module part 41 and a sending module part 43 (which may also be collectively referred to as a transceiver module). The part for radio frequency signal transmission/reception and conversion is mainly configured to: send/receive a radio frequency signal and perform conversion between a radio frequency signal and a baseband signal. The part 42 is mainly configured to: perform baseband processing, control the network device, and the like. The receiving module 41 may also be referred to as a receiver, a receiver circuit, or the like. The sending module 43 may also be referred to as a transmitter, a transmitter circuit, or the like. The part 42 is usually a control center of the network device, may usually be referred to as a processing module, and is configured to control the network device to perform steps performed by the network device in FIG. 8 to FIG. 16. For details, refer to descriptions of the foregoing related parts.

The part 42 may include one or more boards. Each board may include one or more processors and one or more memories. The processor is configured to read and execute a program in the memory to implement a baseband processing function and control the network device. If there are a plurality of boards, the boards may be interconnected to enhance a processing capability. In an optional implementation, a plurality of boards may share one or more processors, or a plurality of boards may share one or more memories, or a plurality of boards may simultaneously share one or more processors.

For example, in an embodiment, the sending module 43 is configured to perform a function of the network device in steps 902, 903, and 904 in the embodiment shown in FIG. 9. The part 42 is configured to perform a function of the network device in step 901 in the embodiment shown in FIG. 9.

For another example, in an embodiment, the sending module 43 is configured to perform a function of the network device in steps 1102, and 1104 in the embodiment shown in FIG. 11. The part 42 is configured to perform a function of the network device in step 1101 in the embodiment shown in FIG. 11.

The objectives, technical solutions, and beneficial effects of this application are further described in detail in the foregoing specific implementations. It should be understood that the foregoing descriptions are merely specific implementations of this application, but are not intended to limit the protection scope of this application. Any modification, equivalent replacement, or improvement made based on the technical solutions of this application shall fall within the protection scope of this application.

What is claimed is:

1. A communication method, comprising:
   obtaining, by a first terminal device, a first multicast configuration parameter, wherein the first multicast configuration parameter comprises a group radio network temporary identifier (G-RNTI) and an identifier of a multicast service;
   receiving, by the first terminal device in an idle state or an inactive state, the multicast service based on the first multicast configuration parameter; and
   receiving, by the first terminal device, a connection release message from a network device, wherein the connection release message comprises first indication information, and the first indication information indicates that the first terminal device is allowed to receive the multicast service based on the first multicast configuration parameter after entering the idle state or the inactive state.

2. The method according to claim 1, wherein the obtaining, by a first terminal device, a first multicast configuration parameter comprises:
   receiving, by the first terminal device, the first multicast configuration parameter from a network device through a common channel, wherein the first terminal device is in the idle state or the inactive state.

3. The method according to claim 1, wherein the obtaining, by a first terminal device, a first multicast configuration parameter comprises:
   obtaining, by the first terminal device, the first multicast configuration parameter before entering the idle state or the inactive state;
   wherein obtaining, by the first terminal device, the first multicast configuration parameter comprises:

setting up a radio resource control (RRC) connection with the network device; and obtaining the first multicast configuration parameter through the RRC connection that is set up.

4. The method according to claim 1, further comprising:

prior to obtaining the first multicast configuration parameter, when entering a new cell and when the first terminal device is in the idle state or the inactive state, triggering RRC connection setup or RRC connection resume to set up a new connection.

5. The method according to claim 1, further comprising:

determining that a quality of a measured reference signal is less than an access threshold;

sending, by the first terminal device in the idle state or the inactive state, a connection request to the network device, wherein the access threshold is configured by the network device.

6. The method according to claim 5, wherein the quality of a measured reference signal is reference signal received power (RSRP) or reference signal received quality (RSRQ).

7. The method according to claim 1, wherein the method further comprises:

sending, by the first terminal device, second indication information to the network device, wherein the second indication information indicates that the first terminal device has a capability of receiving the multicast service.

8. A communication method, comprising:

sending, by a network device, a first multicast configuration parameter to a first terminal device, wherein the first multicast configuration parameter comprises a group radio network temporary identifier (G-RNTI) and an identifier of a multicast service;

sending, by the network device, the multicast service based on the first multicast configuration parameter; and sending, by the network device, a connection release message to the first terminal device, wherein the connection release message comprises first indication information, and the first indication information indicates that the first terminal device is allowed to receive the multicast service based on the first multicast configuration parameter after entering an idle state or an inactive state.

9. The method according to claim 8, wherein the sending, by a network device, a first multicast configuration parameter to a first terminal device comprises:

sending, by the network device, the first multicast configuration parameter to the first terminal device through a common channel.

10. The method according to claim 8, wherein the method further comprises:

sending, by the network device, a connection request to the first terminal device, wherein the connection request is used to request the first terminal device to enter a connected state.

11. The method according to claim 8, further comprising:

receiving, by the network device, a connection request to the network device when a quality of a measured reference signal is less than an access threshold, wherein the access threshold is configured by the network device.

12. The method according to claim 11, wherein the quality of a measured reference signal is reference signal received power (RSRP) or reference signal received quality (RSRQ).

13. The method according to claim 8, wherein the method further comprises:

receiving, by the network device, second indication information from the first terminal device, wherein the second indication information indicates that the first terminal device has a capability of receiving the multicast service.

14. A communication apparatus, comprising:

at least one processor in communications with one or more memories storing programming instructions for execution by the at least one processor to cause the communication apparatus to:

obtain a first multicast configuration parameter, wherein the first multicast configuration parameter comprises a group radio network temporary identifier (G-RNTI) and an identifier of a multicast service;

receive the multicast service based on the first multicast configuration parameter; and receiving a connection release message from a network device, wherein the connection release message comprises first indication information, and the first indication information indicates that the communication apparatus is allowed to receive the multicast service based on the first multicast configuration parameter after entering an idle state or an inactive state.

15. The communication apparatus according to claim 14, wherein the programming instructions, when executed by the at least one processor, cause the communication apparatus to:

receive the first multicast configuration parameter from a network device through a common channel, wherein the communication apparatus is in the idle state or the inactive state.

16. The communication apparatus according to claim 14, wherein the programming instructions, when executed by the at least one processor, cause the communication apparatus to:

obtain the first multicast configuration parameter before entering the idle state or the inactive state;

set up a radio resource control (RRC) connection with the network device; and obtain the first multicast configuration parameter through the RRC connection that is set up.

17. The communication apparatus according to claim 14, wherein the programming instructions, when executed by the at least one processor, cause the communication apparatus to:

prior to obtaining the first multicast configuration parameter, when entering a new cell and when the communication apparatus is in the idle state or the inactive state, trigger RRC connection setup or RRC connection resume to set up a new connection.

18. The communication apparatus according to claim 14, wherein the programming instructions, when executed by the at least one processor, cause the communication apparatus to:

determine that a quality of a measured reference signal is less than an access threshold;

send, in the idle state or the inactive state, a connection request to the network device, wherein the access threshold is configured by the network device.

19. The communication apparatus according to claim 18, wherein the quality of a measured reference signal is reference signal received power (RSRP) or reference signal received quality (RSRQ).

20. The communication apparatus according to claim 14, wherein the programming instructions, when executed by the at least one processor, cause the communication apparatus to:

send second indication information, wherein the second indication information indicates that the first terminal device has a capability of receiving the multicast service.

21. A communication apparatus, comprising:
at least one processor in communications with
one or more memories storing programming instructions for execution by the at least one processor to cause the communication apparatus to:
send a first multicast configuration parameter to a first terminal device, wherein the first multicast configuration parameter comprises a group radio network temporary identifier (G-RNTI) and an identifier of a multicast service;
send the multicast service based on the first multicast configuration parameter; and
sending a connection release message to the first terminal device, wherein the connection release message comprises first indication information, and the first indication information indicates that the first terminal device is allowed to receive the multicast service based on the first multicast configuration parameter after entering an idle state or an inactive state.

22. The communication apparatus according to claim 21, wherein the programming instructions, when executed by the at least one processor, cause the communication apparatus to:
send the first multicast configuration parameter to the first terminal device through a common channel.

23. The communication apparatus according to claim 21, wherein the programming instructions, when executed by the at least one processor, cause the communication apparatus to:
send a connection request to the first terminal device, wherein the connection request is used to request the first terminal device to enter a connected state.

24. The communication apparatus according to claim 21, wherein the programming instructions, when executed by the at least one processor, cause the communication apparatus to:
receive a connection request to the communication apparatus when a quality of a measured reference signal is less than an access threshold, wherein the access threshold is configured by the communication apparatus.

25. The communication apparatus according to claim 24, wherein the quality of a measured reference signal is reference signal received power (RSRP) or reference signal received quality (RSRQ).

26. The communication apparatus according to claim 21, wherein the programming instructions, when executed by the at least one processor, cause the communication apparatus to:
receive second indication information, wherein the second indication information indicates that the first terminal device has a capability of receiving the multicast service.

* * * * *